United States Patent
Higginbottom et al.

(10) Patent No.: US 12,037,282 B2
(45) Date of Patent: Jul. 16, 2024

(54) STRENGTHENED GLASS ARTICLES WITH REDUCED DELAYED BREAKAGE AND METHODS OF MAKING THE SAME

(71) Applicant: CORNING INCORPORATED, Corning, NY (US)

(72) Inventors: Rebecca Vernon Higginbottom, Painted Post, NY (US); Weirong Jiang, Corning, NY (US); Sean Thomas Miller, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 521 days.

(21) Appl. No.: 16/599,282

(22) Filed: Oct. 11, 2019

(65) Prior Publication Data
US 2020/0140327 A1     May 7, 2020

Related U.S. Application Data

(60) Provisional application No. 62/754,388, filed on Nov. 1, 2018.

(51) Int. Cl.
    *C03C 21/00*     (2006.01)
    *C03C 23/00*     (2006.01)

(52) U.S. Cl.
    CPC .......... *C03C 21/002* (2013.01); *C03C 23/007* (2013.01)

(58) Field of Classification Search
None
See application file for complete search history.

(56) References Cited

U.S. PATENT DOCUMENTS 3,751,238 A * 8/1973 Grego ............... C03C 21/002
                                          65/114
3,765,855 A * 10/1973 Larrick .............. C03C 21/00
                                        351/159.73

(Continued)

FOREIGN PATENT DOCUMENTS

| CN | 102131740 A | 7/2011 |
| CN | 104692636 A | 6/2015 |

(Continued)

OTHER PUBLICATIONS

Japanese Patent Application No. 2021-523866, Office Action, dated Aug. 24, 2022, 6 pages (3 pages of English Translation and 3 pages of Original Copy); Japanese Patent Office.

(Continued)

*Primary Examiner* — Jodi C Franklin
(74) *Attorney, Agent, or Firm* — F. Brock Riggs

(57) ABSTRACT

A method of strengthening glass articles includes introducing potassium ions to a surface region of the glass by an initial ion-exchange process, thermally treating the glass at a thermal treatment temperature and time sufficient to diffuse the potassium ions further into the glass to a depth of layer, and introducing a compressive stress of greater than 400 MPa at the surface through a final ion-exchange process. The final ion-exchange process may be conducted at a final ion-exchange temperature of no more than 450° C. The method of strengthening produces a glass article having a compressive stress of at least 400 MPa at the surface, a depth of compression of at least 30 μm, and a central tension less than a threshold central tension above which flaws penetrating into the central region of the glass exhibit spontaneous self-propagation of the flaw front through and across the glass.

19 Claims, 14 Drawing Sheets

(56) References Cited

U.S. PATENT DOCUMENTS

| | | | | |
|---|---|---|---|---|
| 3,844,754 | A * | 10/1974 | Grubb | C03C 21/002 65/30.14 |
| 4,726,981 | A * | 2/1988 | Pierson | C03C 10/0027 428/428 |
| 6,286,337 | B1 * | 9/2001 | Palmquist | C03B 5/2252 65/157 |
| 7,666,511 | B2 | 2/2010 | Ellison et al. | |
| 8,158,543 | B2 | 2/2012 | Dejneka et al. | |
| 8,312,739 | B2 * | 11/2012 | Lee | C03C 3/093 65/30.13 |
| 8,561,429 | B2 * | 10/2013 | Allan | C03C 3/093 65/400 |
| 8,586,492 | B2 | 11/2013 | Barefoot et al. | |
| 8,802,581 | B2 | 8/2014 | Dejneka et al. | |
| 8,951,927 | B2 | 2/2015 | Dejneka et al. | |
| 8,980,777 | B2 | 3/2015 | Danielson et al. | |
| 9,145,329 | B2 | 9/2015 | Drake et al. | |
| 9,156,724 | B2 | 10/2015 | Gross | |
| 9,290,413 | B2 | 3/2016 | Dejneka et al. | |
| 9,346,703 | B2 | 5/2016 | Bookbinder et al. | |
| 9,517,967 | B2 | 12/2016 | Dejneka et al. | |
| 9,850,162 | B2 | 12/2017 | DeMartino et al. | |
| 9,977,470 | B2 | 5/2018 | Demartino et al. | |
| 11,078,106 | B2 * | 8/2021 | Gomez | C03C 3/095 |
| 2008/0057275 | A1 * | 3/2008 | Grzesik | C03B 5/43 428/688 |
| 2009/0120133 | A1 * | 5/2009 | Fraley | C03B 5/225 65/347 |
| 2009/0272150 | A1 * | 11/2009 | Kotacska | C03B 7/02 65/374.12 |
| 2010/0009154 | A1 * | 1/2010 | Allan | C03C 3/093 501/67 |
| 2010/0035038 | A1 * | 2/2010 | Barefoot | C03C 3/078 428/220 |
| 2011/0294648 | A1 * | 12/2011 | Chapman | C03C 21/002 501/63 |
| 2013/0101596 | A1 * | 4/2013 | DeMartino | A61K 38/193 428/34.4 |
| 2013/0224492 | A1 * | 8/2013 | Bookbinder | C03C 21/002 65/30.14 |
| 2014/0370264 | A1 * | 12/2014 | Ohara | C03C 4/18 428/220 |
| 2014/0370304 | A1 * | 12/2014 | Axtell, III | B60J 1/00 428/428 |
| 2015/0157533 | A1 * | 6/2015 | DeMartino | C03C 21/007 53/473 |
| 2017/0022092 | A1 | 1/2017 | Demartino et al. | |
| 2017/0022099 | A1 * | 1/2017 | Axtell, III | C03C 21/005 |
| 2017/0158556 | A1 * | 6/2017 | Dejneka | C03C 21/002 |
| 2017/0197870 | A1 * | 7/2017 | Finkeldey | C03B 27/016 |
| 2017/0240450 | A1 * | 8/2017 | Meng | C03B 5/2252 |
| 2017/0320769 | A1 * | 11/2017 | Guo | C03C 4/18 |
| 2017/0334770 | A1 * | 11/2017 | Luzzato | C03C 17/001 |
| 2018/0246257 | A1 | 2/2018 | Genier et al. | |
| 2018/0362398 | A1 | 12/2018 | DeMartino et al. | |
| 2018/0370194 | A1 * | 12/2018 | Claireaux | B32B 17/10119 |
| 2019/0002332 | A1 * | 1/2019 | Saito | C03B 29/025 |
| 2019/0023611 | A1 * | 1/2019 | Luzzato | C03C 21/002 |
| 2019/0322563 | A1 * | 10/2019 | Bookbinder | C30B 29/16 |

FOREIGN PATENT DOCUMENTS

| | | |
|---|---|---|
| CN | 106604901 A | 4/2017 |
| CN | 108367964 A | 8/2018 |
| JP | 2011-527661 | 11/2011 |
| JP | 2015-511573 A | 4/2015 |
| JP | 2017-030995 A | 2/2017 |
| WO | 2010005578 A1 | 1/2010 |
| WO | 2017/018376 A1 | 2/2017 |
| WO | 2018/147288 A1 | 8/2018 |

OTHER PUBLICATIONS

Chinese Patent Application No. 201980073126.2, Office Action dated Jun. 27, 2022, 5 pages (English Translation Only), Chinese Patent Office.

International Search Report and Written Opinion of the European International Searching Authority; PCT/US2019/057166; dated Jan. 27, 2020; 12 pgs.

* cited by examiner

STRENGTHENED GLASS ARTICLES WITH REDUCED DELAYED BREAKAGE AND METHODS OF MAKING THE SAME

CROSS-REFERENCE TO RELATED APPLICATION

This Application claims the benefit of priority under 35 U.S.C. § 120 of U.S. Provisional Application Ser. No. 62/754,388 filed on Nov. 1, 2018, the content of which is relied upon and incorporated herein by reference in its entirety.

TECHNICAL FIELD

The present specification generally relates to strengthened glass articles, in particular strengthened glass articles having high mechanical strength and low internal tension, and methods of strengthening the glass articles.

BACKGROUND

Historically, glass has been used to produce a variety of articles. For example, because of its hermeticity, optical clarity, and excellent chemical durability relative to other materials, glass has been a preferred material for pharmaceutical applications, including, without limitation, vials, syringes, ampoules, cartridges, and other glass articles. The glass used in pharmaceutical packaging must have adequate mechanical and chemical durability so as to not affect the stability of the pharmaceutical formulations contained therein. Glasses having suitable chemical durability include those glass compositions within the ASTM standard 'Type IA' and 'Type IB' glass compositions which have a proven history of chemical durability.

A concern for food and drug manufacturers is providing glass containers having sufficient strength to minimize damage and breakage caused by external sources of damage, such as handling and/or transport of the glass containers. While glass containers are superior to many alternative materials, they are not unbreakable and occasionally experience damage from handling and/or transport. Cracks are severe damage flaws that extend through the wall thickness, compromising content sterility but not leading to catastrophic failure of the package.

SUMMARY

The present disclosure provides a strengthened glass article, such as a package, container, or vessel comprising a glass and adapted to contain pharmaceutical products or vaccines, and foodstuff containers (e.g., bottles, baby food jars, etc.) in a hermetic and/or sterile state. The strengthened glass articles are strengthened by a method of strengthening that produces compression stress in a surface region of the glass and tensile stress in a central region of the glass. The strengthening process is designed such that the compressive stress at the surface and the depth of layer are sufficient to provide mechanical strength and resistance to external sources of damage. However, the method strengthening the glass is also designed to maintain the central tension less than a threshold central tension below which flaw damage extending into a central region of the glass (i.e., the central region is the region of the glass under a central tension) does not propagate through the thickness of the wall or laterally across the surfaces of the glass. Thus, the method of strengthening glass may produce a glass article having mechanical strength to resist flaw damage from external sources of damage, but also exhibits minimal delayed breakage risk.

Accordingly, in one or more aspects of the disclosure, a method of strengthening a glass article may include introducing potassium ions into a surface region of a glass of the glass article, the glass comprising a first surface, a second surface, and a thickness from the first surface to the second surface. The surface region may extend into the glass from the first surface, the second surface, or both. After introducing the potassium ions into the surface region of the glass, the method may further include, thermally treating the glass at a thermal treatment temperature and for a thermal treatment time sufficient to diffuse at least a portion of the potassium ions from the surface region into the glass to a depth in the glass that results in a depth of compression (DOC) of greater than or equal to 30 micrometers ($\mu$m) and, after thermally treating the glass, introducing a compressive stress of greater than or equal to 400 megapascals (MPa) to the surface region of the glass by subjecting the glass to a final ion-exchange process under conditions sufficient to maintain a central tension in the glass of less than 13 MPa.

In other aspects of the disclosure, an article may comprise a glass, and the glass may comprise a first surface, a second surface, and a compression region extending from the first surface, the second surface, or both to a depth of compression (DOC). The compression region may be under a compressive stress. The article may further include a central region under a central tension, the central region extending inward from the DOC. The compressive stress measured at the first surface, the second surface, or both may be greater than or equal to 400 megapascals (MPa), the DOC may be at least 30 micrometers (30 $\mu$m), and the central tension may be less than a threshold central tension, above which a stored elastic energy in the central region is sufficient to cause flaws extending into the central region to self-propagate through a thickness of the glass from the first surface to the second surface and laterally through the glass.

These and other aspects, advantages, and salient features will become apparent from the following detailed description, the accompanying drawings, and the appended claims.

DETAILED DESCRIPTION

Figure 1:
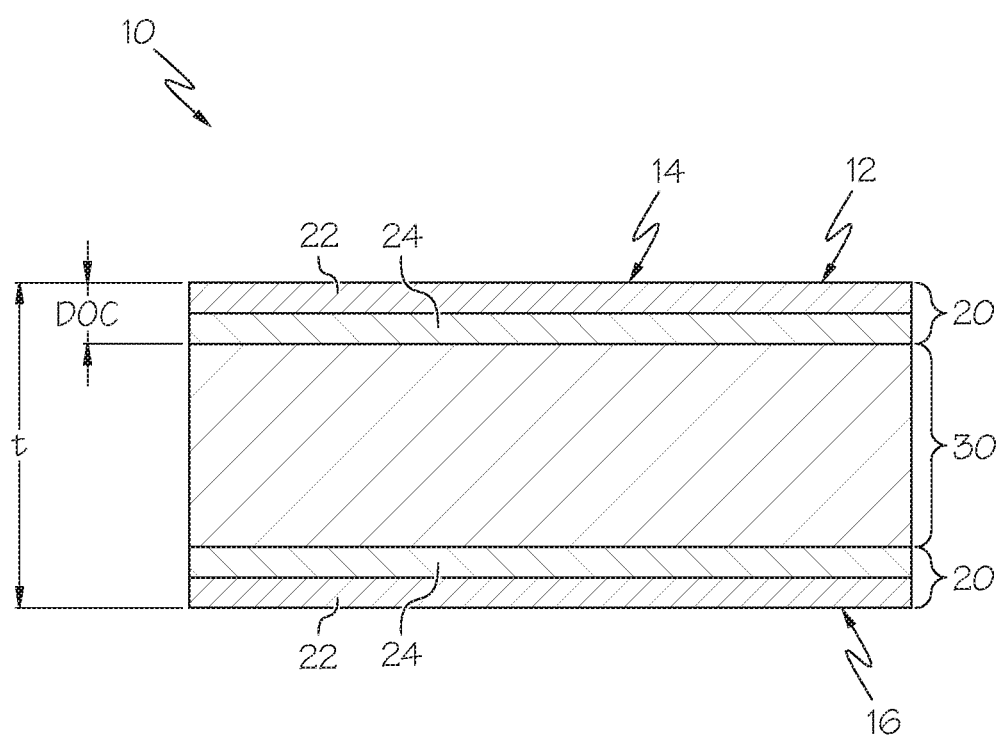
FIG. 1 schematically depicts a cross-sectional view of a portion of a glass of a glass article, according to one or more embodiments shown and described herein.

Reference will now be made in detail to embodiments of methods of strengthening glass articles and the strengthened glass articles, examples of which are illustrated in the accompanying drawings. Whenever possible, the same reference numerals will be used throughout the drawings to refer to the same or like parts. The present disclosure is directed to a method of strengthening glass articles and the strengthened glass articles made therefrom. Referring to FIG. 1, a glass article 10 strengthened by the method disclosed herein is schematically depicted. The glass article 10 includes a glass 12 having a first surface 14, a second surface 16, and a thickness t measured between the first surface 14 and the second surface 16. The glass 12 includes one or more compression regions 20 that extend from the first surface 14, the second surface 16, or both to a depth of compression (DOC) and is under a compressive stress, and a central region 30 that extends inward from the DOC and is under a central tension. Each of the compression regions 20 includes a surface region 22 proximate the first surface 14 and/or the second surface 16 and an interior compression region 24 extending from the surface region 22 to the DOC. The method of strengthening is a three-stage strengthening process that includes introducing potassium ions into the surface region 22 of the glass 12, thermally treating the glass 12 at a temperature and for a time sufficient to diffuse at least a portion of the potassium ions into the glass 12 to a depth within the glass sufficient to produce the DOC, and then introducing a compressive stress that may be greater than or equal to 400 megapascals (MPa) to the surface regions 22 of the glass 12. The method of strengthening the glass article 10 may produce a glass article 10 having a compressive stress and DOC sufficient to provide mechanical strength to resist damage from external sources while also having a central tension that is low enough that flaws extending into the central region 30 of the glass 12 do not self-propagate through the glass 12, which may result in destruction of the article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

As used herein, "glass article" may refer to an article comprising a glass, such as a glass container for example.

As used herein, "depth of compression" (abbreviated DOC) may refer to a depth within the glass at which the stress in the glass transitions from compressive stress in the compression layer to tensile stress in the central region. The DOC is related to the depth in the glass to which the potassium or other ions diffuse during the strengthening process.

As used herein, "depth of layer" (abbreviated DOL) may refer to a depth within the glass at which the concentration of potassium ions is reduced to the bulk concentration of potassium ions in the glass. The DOC is proportional to the DOL and may be slightly less in magnitude than the DOL.

As used herein, "threshold central tension" may refer to a value of the central tension in the central region of the glass above which central tension flaws that extend into the central region exhibit self-propagation through the thickness of the glass from the first surface to the second surface and laterally across the glass.

As used herein, the terms "borosilicate glass" and "borosilicate glass composition," may refer to glass compositions which comprise boron at concentrations in excess of 1 wt. % of the glass composition.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass is a preferred material for pharmaceutical packaging for several reasons, including optical clarity, hermeticity, and chemical inertness. However, it is possible for a glass package to exhibit a through-thickness crack which can compromise the contents' hermeticity or sterility and yet still effectively contain the contents. To prevent through-thickness cracks, glass may be strengthened to improve the mechanical strength of the glass and the ability to resist flaws caused by external sources of damage. The glass may be strengthened by the introduction of a compressive stress. The compressive stresses produced in the glass must be overcome to produce flaws that extend into the central region of the glass or all the way through the thickness of the glass. Such compressive stress may be introduced, for example, by thermal tempering, chemical tempering by ion exchange, lamination of glasses or glasses and plastics (e.g., glass/glass or glass/plastic/glass lamination) having different moduli and/or coefficients of thermal expansion (CTE), and/or coatings of materials having moduli and/or CTE that differ from those of the glass.

Figure 2:
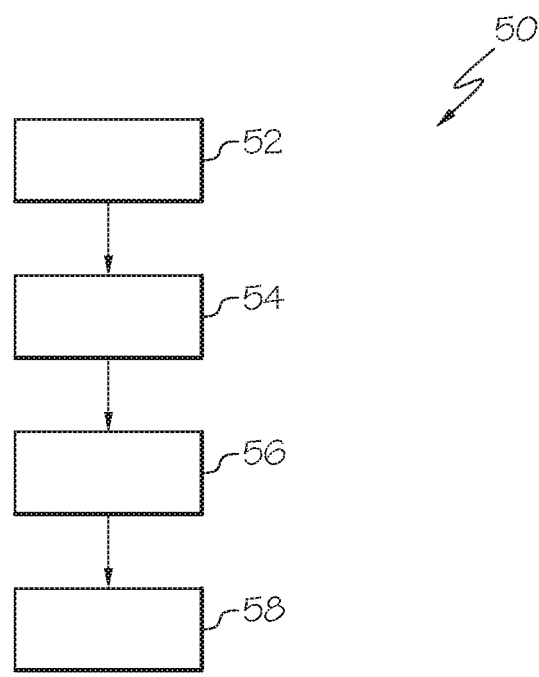
FIG. 2 depicts a flowchart of a prior art method of strengthening glass.

Referring to FIG. 2, a conventional process 50 for strengthening glass includes a single-step ion-exchange process. The conventional process 50 includes converting the glass into a glass article 52, subjecting the glass to the single-step ion-exchange process 54, rinsing the ion-exchange reagents from the glass 56, and washing the glass 58. The single-step ion-exchange process 54 may include submerging the glass in an ion-exchange bath comprising an alkali metal salt, such as potassium nitrate ($KNO_3$) or sodium nitrate ($NaNO_3$) for example. The ion-exchange bath may be maintained at a temperature of at least 300° C. The larger alkali metal ions, such as potassium ions, from the ion-exchange bath diffuse into the glass, replacing smaller ions, such as lithium and/or sodium. Replacement of the smaller ions in the glass with the larger alkali metal ions creates a compressive stress in the glass. The glass may be maintained in contact with the ion-exchange bath for a period of time sufficient to diffuse the larger alkali metal ions (e.g., potassium) into the glass to a depth in the glass sufficient to produce a given DOC.

One consequence of the introduction of compressive stress is the complementary buildup of tensile stress in opposing regions of the glass article, such as a container. For physical force balance to be maintained, the amount of stored elastic energy (SEE) in the compression regions 20 (compression) and in the central region 30 (tension) must be equal. In most cases, the glass surface experiences a large compressive stress, and the interior experiences a smaller magnitude tensile stress. Accordingly, the large compressive stresses at the surfaces of the glass are focused over a shallow depth, while the smaller tensile stress is distributed over the majority of the thickness of the glass.

The compressive stress in the compression regions 20 (e.g., first compression layer and second compression layer) is balanced by tensile stress, also referred to herein as "central tension" or "CT," in a central region of the glass, which extends inward from the DOC. For glass strengthened using a single-step ion-exchange process, the total compressive stress (e.g., the sum of the compressive stresses in the first compression region and the second compression region) is equal to the total central tension. The following Equation 1 (EQU. 1) provides an expression for the relationship between the compressive stress (CS) and central tension (CT) in a glass strengthened by conventional ion-exchange.

$$\int_0^{DOC} CS(x)dx + \int_{L-DOC}^{L} CS(x)dx = \int_{DOC}^{L-DOC} CT(x)dx \qquad 1$$

In EQU. 1, L is the thickness of the glass, DOC is the depth of compression from a first surface of the glass, and (L-DOC) is the depth of compression from the second surface of the glass. CS(x) is the compressive stress as a function of depth x, and CT(x) is the tensile stress as a function of depth x.

For a conventional single step ion-exchange process, the compressive stress may follow the error function profile CS(x)=CS*ERFC(x). Additionally, the central tension distribution CT(x) could be considered constant as a close approximation of the actual central tension distribution within the central tension region. Thus, the relationship between CS and CT for a single-step ion-exchange process can be modeled by the following Equation 2 (EQU. 2):

$$CT = CS * 2 * \int_0^{DOC} \frac{ERFC(x)}{(L - 2DOC)} \qquad \text{EQU. 2}$$

In one integration of EQU. 2, the following relationship between CS and central tension CT in Equation 3 (EQU. 3) is obtained:

$$CT_{erfc} = \frac{CS \cdot DOC_{FSM}}{1 - \frac{2 \cdot DOC_{FSM}}{\alpha \cdot \sqrt{\pi}}} \times \left(\frac{2}{\alpha \cdot \sqrt{\pi}}\right) \qquad \text{EQU. 3}$$

In EQU. 3, $DOC_{FSM}$ is the depth of compression in millimeters measured according to the FSM method described below, t is the thickness of the glass, and α is a constant equal to 1.37. Unless otherwise specified, central tension $CT_{erfc}$ and compressive stress CS are expressed herein in megaPascals (MPa), whereas thickness t and depth of layer $DOC_{FSM}$ are expressed in millimeters. As shown above in EQU. 2 and EQU. 3, the CT is determined from the CS and the DOC. For a single-step ion-exchange process, the CT, CS, and DOC are all interdependent. For example, for a glass having a thickness of 1.0 mm, a CS of 400 MPa and a DOC of 40 micrometers (μm), the CT calculated from EQU. 2 would be about 17 MPa. Thus, for a single-step ion-exchange, a change in either the CS or the DOC results in a change in the CT.

Commercially-available borosilicate glass compositions have been used in conventional pharmaceutical packaging applications. However, ion-exchange of commercially-available borosilicate glass compositions is difficult and requires greater temperatures and longer ion-exchange times to produce a compressive stress sufficient to improve the mechanical strength of the glass compared to other types of glass. For example, ion-exchange of a commercially-available borosilicate glass in an ion-exchange bath comprising $KNO_3$ may require an ion exchange temperature of at least 470° C. and an ion exchange time of at least 20 hours to produce a compression of at least 300 MPa and a DOC of 30 μm.

Aluminosilicate glass compositions may be ion-exchanged to increase the compressive stress and depth of compression to a much greater extent compared to borosilicate glass compositions. For example, single-step ion-exchange of aluminosilicate glass in a bath of $KNO_3$ at a temperature of 450° C. and for a time of less than 2 hours (e.g., from 2 hours to 10 hours) may produce a compressive stress of greater than 400 MPa, or even greater than 500 MPa, at the surface of the glass and a DOC of greater than 30 μm. As previously discussed, in a single-step ion-exchange process, the CS, DOC, and CT are interrelated so that increasing the CS, the DOC, or both results in a corresponding increase in the central tension (CT). Thus, increasing the CS and DOC of a 1.0 mm thick aluminosilicate glass to 400 MPa and 40 μm, respectively, may increase the CT of the glass to 17 MPa.

It has been found that central tensions in excess of about 13 MPa are sufficient to cause flaws that penetrate into the central region of the glass to self-propagate through the thickness of the glass and laterally across the glass. Self-propagation of flaws in glass having central tensions of greater than 13 MPa is discussed in co-pending U.S. patent application Ser. No. 16/111,160 filed on Aug. 23, 2018, the entire contents of which are incorporated by reference herein in their entirety. At central tensions greater than about 13 MPa, self-propagation of flaws through the thickness of the glass from the first surface to the second surface and laterally across the glass may proceed spontaneously and may render the glass article, such as a pharmaceutical container (e.g., vial, ampoule, cartridge, syringe, jar, etc), unusable for its intended purpose. In other words, self-propagation of flaws through the glass may cause the glass article to completely fail. When the CT is greater than 13 MPa, self-propagation of flaws may result in complete destruction/breakage of the glass article immediately or in a short amount of time, such as less than 24 hours, less than 10 hours, or even less than 1 hour. In some applications, complete failure of the glass article resulting from self-propagation of flaws may provide an indication of a defective glass article, such as identification of a defective pharmaceutical container in which a through crack has compromised the sterility of the container and exposed the contents to the atmosphere. In these applications, the damage to the glass article is easily apparent to the human eye such defective or damaged articles can be removed from inventory before the contents are administered to a patient. In some cases, complete destruction of the glass article (e.g., container) may result in complete loss of the contents.

However, in some applications, self-propagation of flaws rendering the glass article completely unusable for its intended purpose is not desired. For example, in the field of emergency medical response, complete failure of a glass pharmaceutical container in response to flaw damage may result in completely loss of the contents, which may render a critical pharmaceutical composition unavailable in an emergency situation, such as a situation of life or death. Under these circumstances, the availability of the contents of the glass container may outweigh the contamination of the contents resulting from loss of hermeticity or sterility. Thus, in certain circumstances, a glass article having a high compressive stress and DOC with a central tension less than the threshold central tension may be more suitable by providing high mechanical strength to resist flaw damage caused by external sources of damage and improved sharp damage response (i.e., reduced self-propagation of flaws resulting in reduced delayed breakage risk). Thus, the glass articles, such as glass pharmaceutical containers, having high CS and DOC and low CT may be resistant to flaw damage and may maintain the ability to contain the contents even in the event of a through crack developing in the glass.

Single-step ion-exchange processes for strengthening glass articles may be limited in their ability to produce glass articles having high CS and DOC with low CT below the threshold central tension, due to the interdependence of the CS, DOC, and CT. As previously discussed, for single-step ion-exchange processes, the CS, DOC, and CT are interdependent such that changing the CS and/or DOC changes the CT. Therefore, when a glass is ion-exchanged using a single-step ion-exchange process to increase the CS and DOC to improve the mechanical strength of the glass, the central tension also increases. Increasing the CS and DOC to a degree sufficient to improve the mechanical strength of the glass may increase the central tension above the threshold central tension, which results in self-propagation of flaws and increased risk of delayed breakage. There is, therefore, an ongoing need for methods of strengthening glass articles to produce glass articles having high CS, high DOC and reduced CT to minimize self-propagation of flaws and reduce the breakage rate of the glass articles.

Two-step ion-exchange processes have been proposed for engineering the stress profile to reduce the CT in the central region of the glass. In these two-step ion-exchange processes, the first step includes submersing the glass in a poisoned ion-exchange bath to produce a stress profile with a low CS extending to the DOC. As used herein, the term "poisoned ion-exchange bath" may refer to an ion-exchange bath having a substantial concentration of ions other than the alkali metal ions of the ion exchange bath, the other ions reducing the effectiveness of the ion-exchange bath for ion-exchanging the glass. For example, a typical poisoned ion-exchange bath may include concentrations of the smaller sodium or lithium ions replaced by the larger potassium ions or may include other ions, such as calcium ions for example, that reduce the effectiveness of the ion-exchange bath. A poisoned ion-exchange bath may have a poisoning level of greater than 20% of the ions in the ion-exchange bath. In the second step, the glass is submersed in a fresh ion-exchange bath to spike the surface of the glass with potassium ions to increase the CS at the surface. In order to get the desired DOC and CT level, the salt poisoning level must be controlled, such as by adding by adding foreign salts (i.e., salts that do not include the ion intended to be exchanged into the glass) to the ion-exchange bath to increase the poisoning level to the desired level. Thus, the two-step ion-exchange process requires two separate ion-exchange baths.

Figure 3:
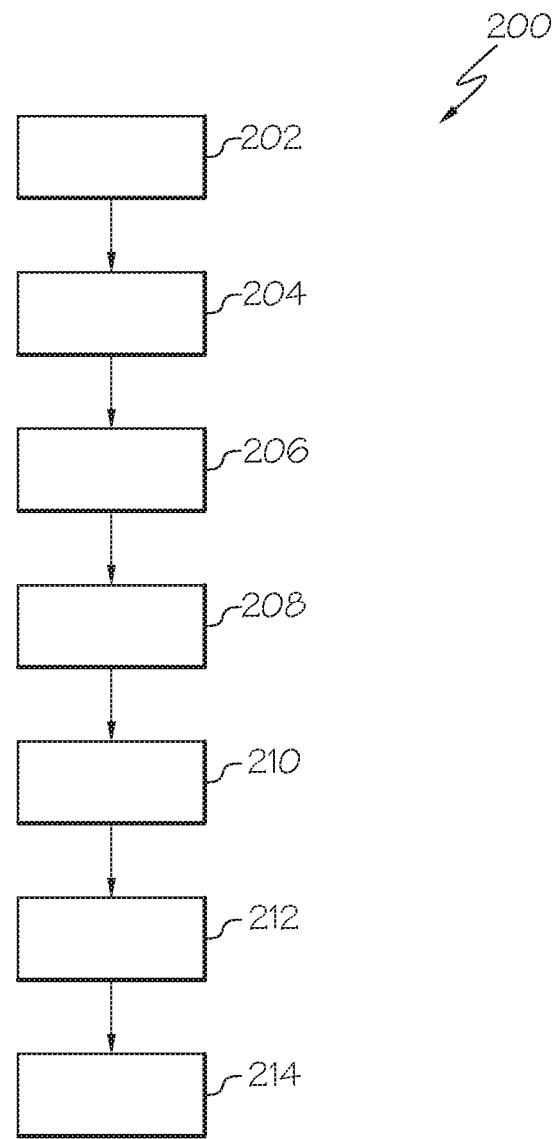
FIG. 3 depicts a flowchart of a method of strengthening glass, according to one or more embodiments shown and described herein.

The methods for strengthening a glass article of the present disclosure are designed to eliminate the interdependence of CS, DOC, and CT so that strengthened glass articles having a high CS, high DOC, and a CT less than the threshold CT can be produced. Referring to FIG. 3, a flowchart illustrating the method 200 for strengthening glass articles of the present disclosure is depicted. The method 200 for strengthening glass articles is a three-step process that may include step 202 of providing a glass article comprising a glass having the first surface, the second surface, and thickness t measured from the first surface to the second surface. The method 200 includes step 204 of introducing potassium ions into the surface region of the glass, step 208 of thermally treating the glass at a temperature and for a time sufficient to diffuse at least a portion of the potassium ions into the glass to a depth of layer, and then step 210 of introducing a compressive stress that may be greater than or equal to 400 megapascals (MPa) to the surface region 22 of the glass 12. The DOL of the potassium ions after introducing the compressive stress to the surface region may be sufficient to produce a DOC of at least 30 µm. In some embodiments, the method 200 may optionally include step 206 of rinsing the glass article after step 204 and before step 208. Additionally, in some embodiments, the method 200 may optionally include the step 212 of rinsing the glass after introducing the compressive stress of 400 MPa to the surface region and/or step 214 of washing the glass article.

As previously discussed, eliminating the interdependence of the CS, DOC, and CT may enable any one of the CS, DOC, and CT to be independently controlled. For example, the methods of strengthening the glass article of the present disclosure enable strengthening of the glass to achieve compressive stress at the first surface and/or the second surface of greater than 400 MPa and a DOC of greater than or equal to 30 µm, while maintaining the CT less than the threshold central tension of 13 MPa, above which flaws exhibit self-propagation. Thus, the CT can be controlled independent of the DOC and CS. The methods for strengthening glass articles of the present disclosure may produce strengthened glass articles exhibiting mechanical strength sufficient to resist damage from external sources as well as improved sharp damage response (i.e., reduced risk of delayed breakage caused by self-propagation of flaws). For example, the higher CS at the surface of the glass may increase the insult force necessary to create flaws in the first surface 14 and/or second surface 16 of the glass 12 and may reduce and/or prevent flaws that do develop in the compression regions 20 from propagating further into the glass 12. The greater DOC may increase the depth to which a flaw must penetrate into the glass 12 to reach the central region 30 under tension. Thus, the higher CS and greater DOC make it more difficult for a flaw to propagate through the DOC to the central region 30. However, if a flaw does propagate into the central region, the decreased CT may preserve the ability of the strengthened glass article to contain liquids and solids by reducing propagation of the flaw so that the glass article is not completely destroyed.

Additionally, the method of strengthening disclosed herein can be accomplished with a single ion-exchange bath and does not require control of a poisoning level in a separate poisoned ion-exchange bath. Each step of the method of strengthening glass articles will now be described in further detail.

The method of making the glass article described hereinabove may include providing a glass having a first surface and a second surface separated by a thickness. The glass may comprise those compositions previously described herein, and be formed by those methods known in the art such as, but not limited to, down-drawing, including slot and/or fusion drawing, float methods, casting methods, molding processes such as, but not limited to, Vello, Danner, and blow-molding processes, or the like. The method of strengthening glass articles is performed on glass articles that have already been converted into the final shape of the article. The step 202 of providing the glass articles may include processing a piece of glass, such as a length of glass tubing, sheet of glass, or other glass, into the glass article. The glass may be processed through one or more thermal conversion steps in which the glass is heated and then mechanically deformed to shape the glass into the desired glass article, such as a container, for example. In some embodiments, the glass article may be a glass container (i.e., container comprising a glass), such as a vial, cartridge, ampoule, syringe, jar, or other container. Although described in the context of pharmaceutical containers, the methods of strengthening glass articles may be applied to other strengthen glass articles, such as bottles or other containers for foodstuffs, cover glass for portable electronics or glass for automotive or aerospace applications, for example.

Introducing the potassium ions to the glass article in step 204 of the method 200 in FIG. 3 may include subjecting the glass article to an initial ion-exchange process. During the initial ion-exchange process, the glass may be submersed in an initial ion-exchange bath that may include an alkali metal salt, such as alkali metal nitrates, alkali metal sulfates, or other alkali metal salts. During the initial ion-exchange, the larger alkali metal ions from the initial ion-exchange bath may diffuse into the surface regions of the glass to replace smaller metal ions, such as smaller alkali metal ions like lithium or sodium ions. The initial ion-exchange process introduces the amount of potassium ions into the surface regions of the glass, such as the surface region proximate the first surface of the glass and the surface region proximate the second surface of the glass.

In some embodiments, the alkali metal salt of the initial ion-exchange bath may be potassium nitrate. In some embodiments, the initial ion-exchange bath may be a fresh ion-exchange bath or a poisoned ion-exchange bath. Alkali metal ions, such as potassium ions, diffuse faster into the glass when a fresh ion-exchange bath is used for the ion-exchange, resulting in a reduced ion exchange time compared to submersion in a poisoned ion-exchange bath. The initial ion-exchange may be conducted using a poisoned ion-exchange bath, but the time required for the initial ion-exchange may be greater compared to a fresh ion-exchange bath. Additionally, submersing the glass in a fresh ion-exchange bath during the initial ion-exchange may enable the use of the same bath for the initial ion-exchange process and the final ion-exchange process, as well as for other single-step ion-exchange processes.

The initial ion-exchange bath may be maintained at an initial ion-exchange temperature of greater than or equal to 300° C., greater than or equal to 350° C., greater than or equal to 400° C., or even greater than or equal to 450° C. The initial ion-exchange temperature of the initial ion-exchange bath may be less than or equal to 550° C., less than or equal to 500° C., or even less than or equal to 450° C. In some embodiments, the initial ion-exchange bath may be maintained at the initial ion-exchange temperature of from 300° C. to 550° C., or from 350° C. to 500° C., from 350° C. to 450° C., or even from 400° C. to 550° C. In some embodiments, the initial ion-exchange bath may be maintained at the initial ion-exchange temperature of from 375° C. to 425° C. At temperatures greater than about 550° C., thermal relaxation in the glass may be more significant, which may reduce the compressive stress in the surface region resulting from introduction of the potassium ions to the surface region. The upper temperature range of the initial ion-exchange process may be further limited by the chemistry of the initial ion-exchange bath and side reactions with the components. For example, potassium nitrate may thermally decompose or react with other constituents of the initial ion-exchange bath at temperatures greater than about 550° C.

The glass of the glass article may be submersed in the initial ion-exchange bath for an initial ion-exchange time sufficient to introduce the amount of potassium ions into the surface regions of the glass at the initial ion-exchange temperature. In some embodiments, the initial ion-exchange time may be greater than or equal to 0.1 hour (hr), greater than or equal to 0.3 hr, or even greater than or equal to 0.5 hr. In some embodiments, the initial ion-exchange time may be less than or equal to 1 hr, such as less than or equal to 0.9 hr, or even less than or equal to 0.8 hr. For example, in some embodiments, the initial ion-exchange time may be from 0.1 hr to 1 hr, from 0.1 hr to 0.9 hr, from 0.1 hr to 8 hr, from 0.3 hr to 1 hr, from 0.3 hr to 0.9 hr, or even from 0.3 hr to 0.8 hr. At initial ion-exchange times greater than about 1 hour, thermal relaxation of the glass caused by exposure of the glass to the initial ion-exchange temperature for the extended period of time may reduce the compressive stress in the surface regions created by introduction of the larger alkali metal ions. Maintaining the initial ion-exchange time at less than or equal to 1 hour may minimize thermal relaxation in the glass, thereby preserving the compressive stress resulting from introduction of the potassium ions. The initial ion-exchange time at high temperature may also be limited by the chemistry of the initial ion-exchange bath and side reactions with components of the initial ion-exchange bath.

In some embodiments, introducing potassium ions into the surface regions of the glass may include subjecting the glass to the initial ion-exchange at the initial ion-exchange temperature of greater than or equal to 400° C. and for an initial ion-exchange time long enough to introduce the amount of potassium ions to the surface regions of the glass sufficient to attain the DOC of greater than 30 µm and the central tension of less than 13 MPa following thermal treatment and the final ion-exchange process. In some embodiments, the initial ion-exchange of the glass may be conducted at an initial ion-exchange temperature of from 400° C. to 550° C. and for an initial ion-exchange time of from 0.1 hours to 1.0 hours.

The amount of potassium ions introduced to the surface regions of the glass by the initial ion-exchange process may be determined based on the target values of the DOC and the CT. The amount of potassium ions may be sufficient to enable the potassium ions to diffuse into the glass to a depth in the glass sufficient to produce the target DOC during the thermal treatment step while maintaining compressive stress in the compression regions of the glass. In other words, enough potassium may be deposited in the surface regions during the initial ion-exchange to prevent the compressive stress from dropping below required level during the thermal treatment step conducted to diffuse the potassium ions further into the glass.

The amount of potassium ions to introduce to the surface regions of the glass during the first ion-exchange to produce the target values of DOC and CT in the glass may be estimated by modeling the initial ion exchange process as a single step ion exchange process using EQU. 2 and/or EQU. 3 previously discussed. The amount of potassium ions introduced to the surface regions may be further fine-tuned by adjusting the initial ion-exchange temperature, the initial ion-exchange time, or both. In some embodiments, the method of strengthening the glass article may include subjecting the glass article to the initial ion-exchange process, determining the amount of the potassium ions to introduce to the surface region of the glass, and adjusting the initial ion-exchange temperature, the initial ion-exchange time, or both of the initial ion-exchange process to introduce the determined amount of potassium ions into each of the surface regions of the glass.

At the conclusion of the initial ion-exchange time, the glass article comprising the glass may be removed from the initial ion-exchange bath. In some embodiments, the glass of the glass article may be rinsed to remove the reagents from the initial ion-exchange bath from the surfaces of the glass (e.g., the first surface and the second surface).

Referring again to FIG. 3, the method of strengthening the glass article includes thermally treating the glass article (step 208) after introducing the potassium ions to the surface regions of the glass, such as after subjecting the glass article to the initial ion-exchange process. Thermally treating the glass article after introducing the potassium ions to the surface regions may cause the potassium ions in the surface regions of the glass to diffuse further into the glass to a DOL (i.e., towards the center of the glass). The DOL to which the potassium ions are diffused during the thermal treatment may be sufficient to produce the target DOC in the glass. Diffusion of the potassium ions further into the glass may produce compressive stress in interior compression regions of the glass, each of which extends from one of the surface regions to the DOC. Diffusion of the potassium ions further into the glass to the DOL may increase the DOC, which may improve the deep flaw region load bearing performance of the glass. In other words, increasing the DOC may increase the depth to which flaws must penetrate into the glass to reach the central region of the glass, which is under tensile stress. The load bearing performance of the glass relates to the mechanical strength of the glass and refers to the amount of force exerted on the glass required to cause breakage or catastrophic failure of the glass. Load bearing performance of the glass will be discussed in further detail in relation to the Examples presented herein.

Thermally treating the glass of the glass article may include subjecting the glass to a thermal treatment temperature for a thermal treatment time sufficient to diffuse at least a portion of the potassium ions from the surface regions to a DOL sufficient to produce the DOC greater than or equal to 30 µm. Heat may be removed from the glass article at the conclusion of the thermal treatment time. In some embodiments, the glass of the glass article may be thermally treated by placing the glass articles in an oven or other heating apparatus maintained at the thermal treatment temperature and removing the glass articles from the oven at the conclusion of the thermal treatment time. The thermal treatment temperature may be greater than or equal to 350° C., greater than or equal to 400° C., or even greater than or equal to 450° C. In some embodiments, the thermal treatment temperature may be less than or equal to 600° C., less than or equal to 550° C., or even less than or equal to 500° C. In some embodiments, the thermal treatment temperature may be from 350° C. to 600° C., such as from 350° C. to 550° C., from 400° C. to 550° C., or even from 400° C. to 500° C. The process window for the thermal treatment temperature may be greater than the process window for the first ion-exchange temperature of the first ion-exchange process due to removal of the salt bath chemistry limitation from the thermal treatment. Not intending to be bound by any specific theory, it is believed that during thermal treatment, the glass is not subjected to high surface stress such as the high surface stress experienced in an ion-bath. Since thermal relaxation in the glass is driven by temperature, time, and stress, a reduction in the surface stress experienced in the glass may enable the glass to withstand greater thermal treatment temperatures and thermal treatment times without experiencing substantial thermal relaxation compared to the ranges of temperature and time appropriate for the initial ion-exchange.

The thermal treatment time may be sufficient to diffuse at least a portion of the potassium ions in the surface regions of the glass to the DOL and may be short enough to minimize thermal relaxation of the glass to maintain the compressive stress in the compression region caused by introducing the potassium ions and diffusing the potassium ions to the DOL. For example, in some embodiments, the thermal treatment time may be sufficient at the thermal treatment temperature to diffuse potassium ions from the surface regions into the glass to a DOL that is sufficient to produce a DOC of at least 30 μm in the glass. In some embodiments, the thermal treatment time may be greater than or equal to 1 hr, greater than or equal to 2 hrs, or even greater than or equal to 3 hrs. In some embodiments, the thermal treatment time may be less than or equal to 24 hrs, less than or equal to 20 hrs, less than or equal to 10 hrs, or even less than or equal to 5 hrs. In some embodiments, the thermal treatment time may be from 1 hr to 24 hr, from 1 hr to 10 hr, from 1 hr to 5 hr, from 2 hr to 24 hr, from 2 hr to 10 hr, or from 2 hr to 5 hr.

The thermal treatment time to achieve a specific DOC may depend on the thermal treatment temperature. For example, as the thermal treatment temperature increases, the thermal treatment time for achieving the specific DOC decreases. Likewise, as the thermal treatment temperature decreases, the thermal treatment time for attaining the specific DOC increases. Increasing the thermal treatment temperature may, therefore, reduce the thermal treatment time to achieve the specific DOC, which may reduce the cycle time and increase the production rate of the glass articles. However, increasing the thermal treatment temperature may result in increased thermal relaxation within the glass, which can reduce the compressive stress produced by the potassium ions introduced to the glass and diffused to the DOL. The reduction in compressive stress in the compression region caused by thermal relaxation may reduce the mechanical strength of the glass and degrade the load bearing performance and damage resistance of the glass. Therefore, the thermal treatment temperature and thermal treatment time may be modified to balance production rate with thermal relaxation.

Thermally treating the glass may include varying the thermal treatment temperature during the thermal treatment. In some embodiments, thermally treating the glass may include continuously increasing or decreasing the thermal treatment temperature throughout the thermal treatment time. In other embodiments, thermally treating the glass may include subjecting the glass to a plurality of thermal treatment temperatures during the thermal treatment time. For example, in some embodiments, the glass may be subjected to first thermal treatment at a first thermal treatment temperature for a first thermal treatment time and a second thermal treatment at a second thermal treatment temperature for a second thermal treatment time. The glass may be subjected to 2, 3, 4, 5, or more than 5 different thermal treatment temperatures during the thermal treatment.

In some embodiments, the glass may be rinsed to remove the ion-exchange materials from the surfaces (e.g., first surface and second surface) of the glass after the initial ion-exchange process and before thermally treating the glass (FIG. 3, step 206). However, failure to rinse or wash the glass surfaces before the thermal treatment has been found to have very little influence on the final stress profile and load bearing performance of the glass. Rinsing the glass article (step 206) may include dip rinsing (i.e., submersing the glass of the glass article in a solvent such as water or other organic solvent to rinse off the ion-exchange reagents).

As shown in FIG. 3, following thermal treatment of the glass (step 208), the method may include introducing a compressive stress of greater than or equal to 400 MPa to the surface regions of the glass, such as the surface region proximate the first surface and the surface region proximate the second surface. In some embodiments, introducing the compressive stress into the surface regions of the glass may include subjecting the glass to a final ion-exchange process to produce the compressive stress of greater than or equal to 400 MPa, as determined at the first surface and/or the second surface of the glass. In other words, the final ion-exchange process may be used to "spike" the surface regions of the glass with a high concentration of larger alkali metal ions, such as potassium ions, to increase the compressive stress in the surface regions of the glass.

The final ion-exchange process may include submersing the glass of the glass article into a final ion-exchange bath maintained at a final ion-exchange temperature. The final ion-exchange bath may include an alkali metal salt, such as alkali metal nitrates, alkali metal sulfates, or other alkali metal salts. The alkali metal of the alkali metal salt may be larger in size than other metal ions of the glass composition (e.g., other smaller alkali metal ions, such as sodium and lithium ions). During the final ion-exchange, the larger alkali metal ions from the final ion-exchange bath may diffuse into the surface regions of the glass to replace smaller metal ions, such as smaller alkali metal ions like lithium or sodium ions. The final ion-exchange process introduces an additional amount of potassium ions or other larger alkali metal ions into the surface regions of the glass. In some embodiments, the final ion-exchange bath may include potassium nitrate. In some embodiments, the final ion-exchange bath may be a fresh ion-exchange bath or a slightly poisoned ion-exchange bath. As used herein, a "slightly poisoned ion-exchange bath" refers to an ion-exchange bath has a low poisoning level of less than about 5% by weight compared to a "poisoned ion-exchange bath" having a poisoning level greater than 20% by weight. The slight poisoning of the bath may result from continued use of the bath, which may accumulate small concentrations of smaller alkali metal ions from the glass that are replaced during the ion-exchange.

The final ion-exchange bath may be maintained at a final ion-exchange temperature of less than or equal to 450° C., such as less than or equal to 400° C., less than or equal to 375° C., or even less than or equal to 350° C. Maintaining the final ion-exchange bath at a final ion-exchange temperature less or equal to 450° C. may minimize the degree of thermal relaxation that occurs in the compression regions during the final ion-exchange. In some embodiments, reducing the thermal relaxation in the glass during the final ion-exchange may reduce or prevent decreases in the compressive stress in the interior compression regions between the surface regions and the DOCs. In some embodiments, the final ion-exchange temperature may be greater than or equal to 300° C., greater than or equal to 325° C., or even greater than or equal to 350° C. In some embodiments, the final ion-exchange bath may be maintained at the final ion-exchange temperature of from 300° C. to 450° C., or from 325° C. to 450° C., from 300° C. to 400° C., or even from 350° C. to 400° C.

The glass of the glass article may be submersed in the final ion-exchange bath for a final ion-exchange time sufficient to produce a compressive stress at the first surface, second surface, or both of at least 400 MPa. In some embodiments, the final ion-exchange time may be greater than or equal to 0.1 hr, greater than or equal to 0.3 hr, or even greater than or equal to 0.5 hr. In some embodiments, the final ion-exchange time may be less than or equal to 1 hr, such as less than or equal to 0.9 hr, or even less than or equal to 0.8 hr. For example, in some embodiments, the final ion-exchange time may be from 0.1 hr to 1 hr, from 0.1 hr to 0.9 hr, from 0.1 hr to 8 hr, from 0.3 hr to 1 hr, from 0.3 hr to 0.9 hr, or even from 0.3 hr to 0.8 hr. At final ion-exchange times greater than about 1 hour, thermal relaxation of the glass caused by exposure of the glass to the final ion-exchange temperature for an extended period of time may reduce the compressive stress in the compression regions, in particular the interior compression regions between the surface region and the DOC, thereby reducing the deep flaw region load bearing performance of the glass article. Maintaining the final ion-exchange time at less than or equal to 1 hour may minimize thermal relaxation in the glass, thereby preserving the compressive stress in the interior compression regions. The glass of the glass article may be removed from the final ion-exchange bath at the conclusion of the final ion-exchange time.

In some embodiments, the method may include subjecting the glass article to a final rinse (step 212) and/or final wash following the final ion-exchange process to remove excess alkali metal salts and other reagents from the surfaces of the glass. The final rinse may include dip rinsing the glass article.

Referring again to FIG. 1, the method of strengthening may produce a glass article 10 having improved mechanical strength to resist damage from external sources and having a reduced central tension to reduce delayed breakage caused by self-propagation of flaws extending into the central region 30 of the glass 12. The glass article 10 comprises the glass 12 having the first surface 14, the second surface 16, and the thickness t measured as the distance between the first surface 14 and the second surface 16. The glass 12 has compression regions 20 extending from the first surface 14, the second surface 16, or both to the DOC. The compression regions 20 are under a compressive stress. The glass may have a first compression layer extending from the first surface 14 to a first DOC and a second compression layer extending from the second surface 16 to a second DOC. It is intended for the compression regions 20 to represent either or both of the first compression layer proximate the first surface 14 and the second compression layer proximate the second surface 16. The glass 12 further includes the central region 30 under a central tension (CT) and extending inward from the DOC and disposed between the compression regions 20 (i.e., between the first compression layer and the second compression layer).

The thickness t of the glass 12 may be sufficient to form a container, such as a glass container. In some embodiments, the thickness of the glass 12 may be greater than or equal to 0.3 mm, such as greater than or equal to 0.5 mm, greater than or equal to 0.7 mm, or even greater than or equal to 0.9 mm. In some embodiments, the thickness t of the glass 12 may be sufficient to conform to the standards for pharmaceutical containers. The thickness t of the glass 12 may be less than or equal to 6.0 mm, such as less than or equal to 4.0 mm, less than or equal to 2.5 mm, less than or equal to 2.0 mm, less than or equal to 1.8 mm, less than or equal to 1.5 mm, or even less than or equal to 1.1 mm. In some embodiments, the thickness t of the glass may be from 0.3 mm to 6.0 mm, such as from 0.3 mm to 2.0 mm, from 0.5 mm to 6.0 mm, from 0.8 mm to 2.0 mm, from 0.9 mm to 1.7 mm, or from 0.5 mm to 1.1 mm. It is understood that complex packaging geometries such as vials, cartridges, and bottles may have a variety of wall thicknesses throughout the container.

The DOC (e.g., first DOC and/or second DOC) may be sufficient to increase the depth to which flaws must extend into the glass to reach the central region 30, which is under a tensile stress. Flaws extending into the compression regions 20 can be arrested by the compressive stress in the compression regions 20. As the DOC of the compression regions 20 increases, the depth to which a flaw must extend to penetrate through the compression regions 20 to reach the central region 30 increases. Thus, increasing the DOC of the compression regions 20 may increase the damage resistance of the glass by reducing the probability of a flaw extending through the compression regions 20 and into the central region 30. In some embodiments, the DOC (e.g., the first DOC and/or the second DOC) of the glass 12 may be greater than or equal to 30 μm, such as greater than or equal to 40 μm, or even greater than 50 μm. In some embodiments, the DOC (e.g., the first DOC and/or the second DOC) of the glass 12 may be from 30 μm to 100 μm, such as from 30 μm to 80 μm, from 40 μm to 70 μm, or even from 30 μm to 50 μm. In some embodiments, each DOC may be from 15% to 25% of the thickness t of the glass 12.

The compression regions 20 may have a compressive stress sufficient to provide the mechanical strength to the glass to resist damage from external sources of damage, such as handling, filing, transporting. Increasing the compressive stress in the compression regions 20 increases the insult forces necessary to create flaws in the first surface 14 and/or second surface 16 of the glass 12. Increasing the compressive stress in the compression regions 20 may also reduce and/or prevent flaws in the compression regions 20 from propagating further into the glass 12, such as into the central region 30 of the glass 12. In some embodiments, the compression regions 20 of the glass 12 may have a compressive stress of greater than or equal to 400 MPa, greater than or equal to 450 MPa, or even greater than or equal to 500 MPa as determined at the first surface 14 and/or the second surface 16. In some embodiments, the compression regions 20 may have a compressive stress less than or equal to 1000 MPa, less than or equal to 800 MPa, less than or equal to 750 MPa, or even less than or equal to 700 MPa as determined at the first surface 14 and/or the second surface 16. In some embodiments, the compression regions 20 of the glass 12 may have a compressive stress of from 400 MPa to 750 MPa, such as from 450 MPa to 700 MPa, as determined at the first surface 14 and/or the second surface 16 of the glass 12.

Referring still to FIG. 1, each compression region 20 may include the surface region 22 and the interior compression region 24. The surface region 22 may be proximate the surface, such as the first surface 14 and/or the second surface 16, and may extend from the surface of the glass 12 inward toward the center of the glass 12 (i.e., in the + or −Z direction of the coordinate axis in FIG. 1). The surface region 22 may be defined by the distance into the glass 12 to which the potassium ions from the final ion-exchange process penetrate into the glass. The surface region 22 may have a surface region thickness that is less than the DOC. Each interior compression region 24 may extend from the corresponding surface region 22 to the corresponding DOC. Each interior compression region 24 may comprise the potassium ions introduced during the initial ion-exchange process and diffused into the glass 12 during the thermal treatment. At least a portion of the potassium ions in the surface region 22 resulting from the initial ion-exchange process may further diffuse into the interior compression region 24 during the final ion-exchange process. The surface region 22 may have a greater concentration of potassium ions and greater compressive stress compared to the potassium ion concentrations and compressive stress in the interior compression region 24.

Figure 4:
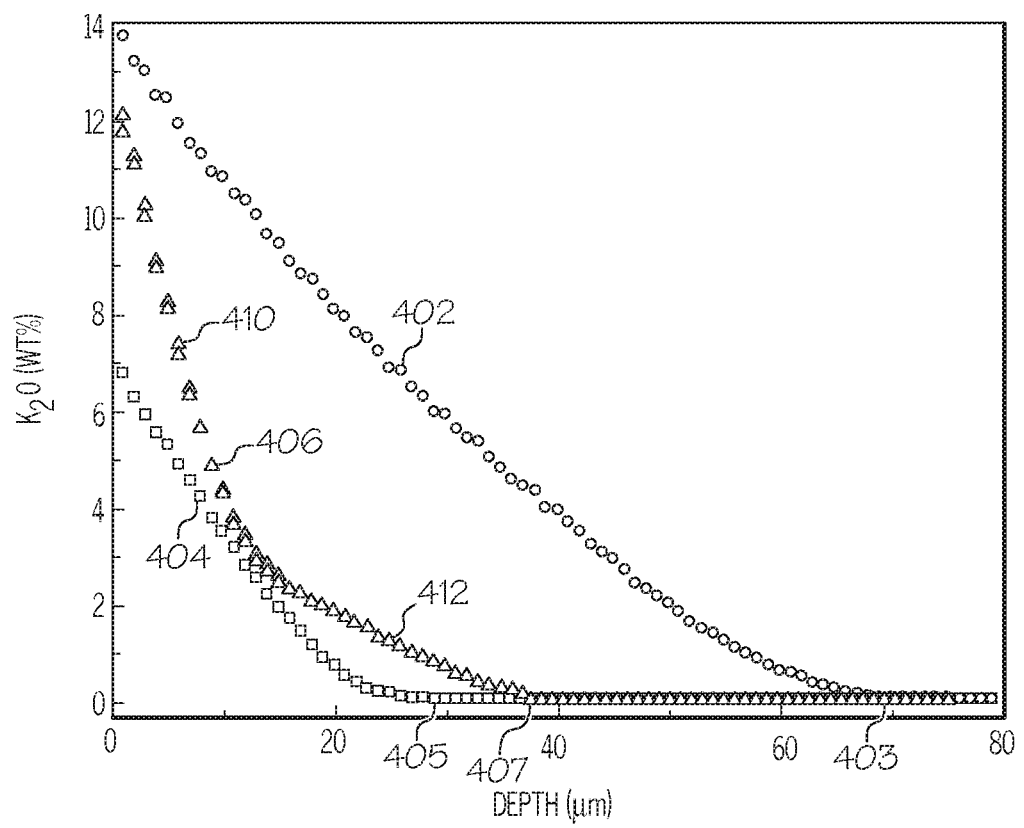
FIG. 4 graphically depicts a concentration of potassium oxide (y-axis) as a function of depth from a first surface or second surface for a borosilicate glass strengthened by prior art method of FIG. 2, an alkali aluminosilicate glass strengthened by the prior art method of FIG. 2, and an alkali aluminosilicate glass strengthened by the method of FIG. 3, according to one or more embodiments shown and described herein.

Additionally, the magnitude of the slope of the potassium ion concentration as a function of depth in the glass in the surface region 22 may be greater than the magnitude of the slope of the potassium ion concentration as a function of depth in the interior compression region 24. Referring to FIG. 4, the potassium ion concentration as a function of depth in the glass is graphically depicted for an aluminosilicate glass subjected to a single stage ion-exchange (402), and borosilicate glass subjected to a single stage ion-exchange process (404), and an aluminosilicate glass subjected to the three stage method of strengthening glass disclosed herein (406). For the aluminosilicate glass subjected to the single stage ion-exchange (402), the potassium ion concentration decreases steadily with increasing depth. Likewise, for the borosilicate glass subjected to the single stage ion exchange (404), the potassium ion concentration also decreases steadily with increasing depth. For the aluminosilicate glass subjected to the three-stage strengthening process disclosed herein (406), the potassium ion concentration decreases rapidly in the surface region as indicated by the greater average slope in the surface region (represented by the first region 410 of curve 406) from the surface (depth=0 μm) to a depth of the surface region (i.e., the depth at which the slope of potassium concentration as a function of depth changes). In FIG. 4, the depth of the surface region (403) is about 15 μm, though this depth may vary depending on the conditions selected for the first ion-exchange process, thermal treatment, and/or the final ion-exchange process. In the interior compression regions of the glass, indicted by the second region 412 of curve 406, the potassium ion concentration decreases with increasing depth at a lesser rate compared to the surface region, first region 410 of curve 406. Thus, FIG. 4 shows that the three-stage strengthening process disclosed herein produces an aluminosilicate glass having two distinct regions within the compression regions of the glass.

Referring still to FIG. 4, the potassium ion concentration at the surface for the aluminosilicate glass subjected to the three-stage strengthening process of the present disclosure may be less than the potassium ion concentration at the surface of the aluminosilicate glass subjected to the single-stage ion exchange. However, the aluminosilicate glass produced using the three-stage strengthening process may exhibit a greater compressive stress at the surface compared to the glass made with the single-stage ion exchange due to less thermal relaxation during the final ion exchange. During the longer ion-exchange time of the single stage ion exchange, exposure to the ion exchange bath at temperatures in excess of 450° C. may result in thermal relaxation, which decreases the compressive stress at the surface of the glass strengthened by the single stage ion exchange. FIG. 4 also shows that the aluminosilicate glass produced by the three-stage strengthening process disclosed herein may exhibit a greater DOC and a greater compressive stress at the surface (as demonstrated by the greater potassium ion concentration at the surface) compared to borosilicate glass strengthened by a single stage ion exchange.

Referring again to FIG. 1, the central region 30 of the glass may have a CT below a threshold CT, above which flaws penetrating into the central region 30 exhibit self-propagation through the thickness of the glass (i.e., in the +/−Z direction of the coordinate axis in FIG. 1). Above the threshold central tension, flaws penetrating into the central region 30 may exhibit self-propagation of the flaw laterally through the glass (i.e., in the +/−X and/or +/−Y directions of the coordinate axis of FIG. 1). Self-propagation of flaws penetrating into the central region 30 of the glass 12 may cause complete destruction of the glass 12 immediately, or within a time period after introduction of the flaw. The influence of central tension on the self-propagation behavior of flaws extending into the central region 30 of the glass 12 is described further in U.S. Pat. No. 9,850,162, filed Feb. 27, 2013, and co-pending U.S. patent application Ser. No. 16/111,160 filed Aug. 23, 2018, both of which are incorporated by referenced herein in their entirety. The breakage caused by self-propagation of the flaws in the central region 30 may render the glass article, such as a glass container, useless for its intended purpose.

As previously discussed herein, in some applications, self-propagation of flaws resulting in complete destruction of the glass article is not desired. For example, in some applications, glass articles, such as glass containers, that can sustain a through crack without complete breakage/destruction of the glass article may be more desirable. The glass articles 10 produced from the method of strengthening glass disclosed herein may have a central tension in the central region 30 less than the threshold CT below which flaws extending into the central region 30 do not experience self-propagation of the flaw through the thickness of the glass 12 and laterally through the glass 12. Thus, the glass articles 10 subjected to the method of strengthening glass disclosed herein may sustain flaw damage extending into the central region 30 of the glass 12 without self-propagation of the flaws that result in complete destruction the glass article 10, such as a container. In some embodiments, the central tension in the central region 30 of the glass 12 may be less than 13 MPa, such as less than or equal to 12 MPa, or even less than or equal to 10 MPa. In some embodiments, the glass 12 may have a central tension in the central region 30 of from 8 MPa to 12 MPa.

As previously discussed, the three-stage strengthening process disclosed herein may eliminate the dependence of CT on the CS and DOC and enable independent control of the CT, CS, and DOC. For example, the DOC may be increased or decreased by increasing or decreasing the thermal treatment temperature and/or the thermal treatment time of the thermal treatment step. The CT may be increased or decreased by increasing or decreasing the initial ion exchange time of the initial ion exchange. To modify the CT independent of the DOC, the increase or decrease in the ion exchange time may be accompanied by a corresponding change in the thermal treatment temperature and/or thermal treatment time. For example, to increase the CT, the initial ion exchange time may be increased to increase the amount of potassium ions introduced to the surface region 22 in the initial ion exchange. To compensate for the greater penetration of potassium ions into the glass resulting from the increased initial ion-exchange time, the thermal treatment temperature and/or the thermal treatment time of the thermal treatment may be reduced to achieve the same target DOC with increased CT. The CS can be increased or decreased by increasing or decreasing the final ion-exchange time and/or final ion-exchange temperature. Increasing or decreasing the CS may also be accompanied by modifications to the thermal treatment to maintain the same DOC and CT. Thus, each of the CT, DOC, and CS can be independently controlled.

This independent control of the CT relative to the DOC and CS enable the glass to be strengthened to provide increased mechanical strength to resist damage without increasing the CT above the threshold at which flaws penetrating into the central region 30 exhibit self-propagation of flaws through the thickness and laterally across the glass.

In some embodiments, an article comprises a glass. The glass may include the first surface and the second surface. The glass may further include a compression region extending from the first surface, the second surface, or both to the DOC, wherein the compression region is under a compressive stress, and a central region under a central tension, wherein the central region extends inward from the DOC. The compressive stress measured at the first surface, the second surface, or both may be greater than or equal to 400 megapascals (MPa), the DOC may be at least 30 micrometers (30 µm), and the central tension is less than a threshold central tension above which a stored elastic energy in the central region is sufficient to cause flaws extending into the central region to self-propagate through a thickness of the glass from the first surface to the second surface and laterally through the glass. In some embodiments the central tension may be less than 13 MPa. In some embodiments, the glass may include the first compression region proximate the first surface and the second compression region proximate the second surface.

Commercially available Borosilicate glasses (ASTM E438-92 (Standard Specification for Glasses in Laboratory Apparatus) Type 1, class A glasses—3.3 ppm/K, Type 1, class B glasses—5.1 ppm/K) that are typically used as containers for pharmaceuticals, serum, vaccines, and the like, may only be strengthened to achieve a compressive stress in a range of from 200 MPa to 300 MPa when ion exchanged for periods that are typically used. To obtain a compressive stress of 300 MPa or greater, such borosilicate glasses must be ion exchanged for at least 20 hours at temperatures of greater than 470° C., which greatly increases the processing time for making the strengthened borosilicate glasses. Thus, these commercially-available borosilicate glasses may not be easily ion-exchanged to achieve high compressive stress. Such glasses are thus less resistant to damage from external sources of damage compared to strengthened glass having a compressive stress greater than 300 MPa. Consequently, the failure rate of borosilicate glass containers due to damage caused by handling, transportation and other sources of external damage may be greater. In contrast, the glasses strengthened by the three-stage strengthening method disclosed herein may achieve a compressive stress of greater than 300 MPa or even greater than 400 MPa in a practical amount of time while maintaining the CT less than the threshold CT, above which self-propagation of flaws extending into the central region 30 causes breakage of the glass.

In some embodiments, the glass article, such as a container comprising a glass, may include at least one aluminosilicate glass. In some embodiments, the aluminosilicate glass may include at least one alkali metal oxide. In some embodiments, the glass article, such as a container, may include a glass composition that is within the ASTM standard type 1b glass compositions.

In some embodiments, the glass article, such as a container, may comprise a chemically durable glass such as that described in U.S. patent application Ser. No. 13/660,141, filed Oct. 25, 2012, by Melinda Drake et al., entitled "Alkaline Earth Alumino-Silicate Glass Compositions with Improved Chemical and Mechanical Durability," which claims priority from U.S. Provisional Patent Application No. 61/551,133, filed Oct. 25, 2011, and having the same title. The contents of both applications are incorporated herein by reference in their entirety. This exemplary glass composition generally includes $SiO_2$, $Al_2O_3$, at least one alkaline earth oxide, and alkali oxides including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, ZnO, or the like, which may be added as fining agents and/or to further enhance the chemical durability of the glass composition. In some embodiments, the glasses described therein include from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkali oxide comprises at least $Na_2O$ and $K_2O$. In other embodiments, the glasses described therein comprise from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkaline earth oxide comprises at least one of SrO and BaO.

In some embodiments, the glass article, such as a container, may comprise a chemically durable glass such as that described in described in U.S. patent application Ser. No. 13/660,450, filed Oct. 25, 2012, by Paul S. Danielson et al., entitled "Glass Compositions with Improved Chemical and Mechanical Durability," which claims priority from U.S. Provisional Patent Application No. 61/551,163, filed Oct. 25, 2011, and having the same title. The contents of both applications are incorporated herein by reference in their entirety. The alkali aluminosilicate glass generally includes $SiO_2$, $Al_2O_3$, at least one alkaline earth oxide, and one or more alkali oxides, such as $Na_2O$ and/or $K_2O$, and is free from boron and compounds containing boron. The alkali aluminosilicate glass composition may also be free from phosphorous and compounds containing phosphorous. The combination of these components enables a glass composition which is resistant to chemical degradation and is also suitable for chemical strengthening by ion exchange. In some embodiments, the glass compositions may further include minor amounts of one or more additional oxides such as, for example, $SnO_2$, $ZrO_2$, ZnO, $TiO_2$, $As_2O_3$ or the like, which may be added as fining agents and/or to further enhance the chemical durability of the glass composition. In some embodiments, such glasses may include from about 67 mol % to about 78 mol % $SiO_2$; from about 3 mol % to about 13 mol % alkaline earth oxide; X mol % $Al_2O_3$; and Y mol % alkali oxide. The alkali oxide may include $Na_2O$ in an amount greater than 8 mol % and a ratio of Y:X which is greater than 1. In other embodiments, such glasses may include from about 67 mol % to about 78 mol % $SiO_2$; from about 3 mol % to about 13 mol % alkaline earth oxide, wherein the alkaline earth oxide may include CaO in an amount greater than or equal to 0.1 mol % and less than or equal to 1.0 mol %; X mol % $Al_2O_3$, wherein X is greater than or equal to 2 mol % and less than or equal to about 10 mol %; Y mol % alkali oxide, wherein a ratio of Y:X is greater than 1. The glass compositions described in U.S. Provisional Patent Applications Nos. 61/551,163 and 61/551,133 are free from boron and compounds of boron and are ion exchangeable, thereby facilitating chemically strengthening of the glass to improve mechanical durability.

In other embodiments, the alkali aluminosilicate glass may include: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≥2 mol %; 2 mol; %≤$Na_2O$–$Al_2O_3$≤6 mol %; and 4 mol %≤($Na_2O$+$K_2O$)–$Al_2O_3$≤10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In other embodiments, the alkali aluminosilicate glass may include: at least one of alumina, and at least one of an alkali metal oxide and an alkali earth metal oxide, wherein –15 mol %≤($R_2O$+R'O–$Al_2O_3$–$ZrO_2$)–$B_2O_3$≤4 mol %, where R is one of Li, Na, K, Rb, and Cs, and R' is one of Mg, Ca, Sr, and Ba. In some embodiments, the alkali aluminosilicate glass may include: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. Pat. No. 8,158,543 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2008, the contents of which are incorporated herein by reference in their entirety.

In other embodiments, the alkali aluminosilicate glass may include: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In other embodiments, the alkali aluminosilicate glass may include $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass may include: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In other embodiments, the alkali aluminosilicate glass may include at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σalkali metal modifiers (mol %))]>1. In some embodiments, the alkali aluminosilicate glass may include: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In other embodiments, the alkali aluminosilicate glass may include $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, the alkali aluminosilicate glass may include: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass may include at least about 4 mol % $P_2O_5$, wherein ($M_2O_3$ (mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass may include 0 mol % $B_2O_3$. The glass is described in U.S. patent application Ser. No. 13/678,013, filed Nov. 15, 2012, by Timothy M. Gross, entitled "Ion Exchangeable Glass with High Crack Initiation Threshold," and claiming priority to U.S. Provisional Patent Application No. 61/560,434, filed Nov. 16, 2011, the contents of which are incorporated herein by reference in their entirety.

In still other embodiments, the alkali aluminosilicate glass may include at least about 50 mol % $SiO_2$ and at least about 11 mol % $Na_2O$. In some embodiments, the glass further comprises $Al_2O_3$ and at least one of $B_2O_3$, $K_2O$, MgO and ZnO, wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %. In particular embodiments, the glass may include: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,296, by Matthew J. Dejneka et al., entitled "Ion Exchangeable Glass with High Compressive Stress," filed Jun. 26, 2012, and claiming priority from U.S. Provisional Patent Ion Application No. 61/503,734, filed Jul. 1, 2011, the contents of which are incorporated herein by reference in their entirety.

In other embodiments, the alkali aluminosilicate glasses described hereinabove are ion exchangeable and may include at least about 50 mol % $SiO_2$; at least about 10 mol % $R_2O$, wherein $R_2O$ comprises $Na_2O$; $Al_2O_3$, wherein $Al_2O_3$ (mol %) < $R_2O$ (mol %); and $B_2O_3$, and wherein $B_2O_3$ (mol %) − ($R_2O$ (mol %) − $Al_2O_3$ (mol %)) ≥ 3 mol %. In some embodiments, the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %. These glasses are described in U.S. Provisional Patent Application No. 61/653,489, filed May 31, 2012, by Matthew J. Dejneka et al., and entitled "Zircon Compatible, Ion Exchangeable Glass with High Damage Resistance," the contents of which are incorporated herein by reference in their entirety.

In other embodiments, the alkali aluminosilicate glasses described hereinabove are ion exchangeable and may include: at least about 50 mol % $SiO_2$; at least about 10 mol % $R_2O$, wherein $R_2O$ comprises $Na_2O$; $Al_2O_3$, wherein −0.5 mol %≤$Al_2O_3$ (mol %) − $R_2O$ (mol %)≤2 mol %; and $B_2O_3$, wherein $B_2O_3$ (mol %) − ($R_2O$ (mol %) − $Al_2O_3$ (mol %)) ≥ 4.5 mol %. In some embodiments, the glasses comprise: at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO, ZnO, or combinations thereof, wherein 0 mol %≤MgO≤6 and 0≤ZnO≤6 mol %; and, optionally, at least one of CaO, BaO, and SrO, wherein 0 mol %≤CaO+SrO+BaO≤2 mol %. These glasses are described in U.S. Provisional Patent Application No. 61/653,485, filed May 31, 2012, by Matthew J. Dejneka et al., and entitled "Ion Exchangeable Glass with High Damage Resistance," the contents of which are incorporated herein by reference in their entirety.

In some embodiments, the alkali aluminosilicate glasses described hereinabove may be substantially free of (i.e., contain 0 mol % of) at least one of lithium, boron, barium, strontium, bismuth, antimony, and arsenic.

In some embodiments, the three-stage method disclosed herein for strengthening glass may be conducted on ion-exchangeable borosilicate glass having a composition that may be more easily ion-exchanged compared to existing, commercially-available borosilicate glasses, which are not easily strengthened through ion-exchange. In some embodiments, the three-stage method for strengthening glass may be applied to an ion-exchangeable borosilicate glass. In some embodiments, the ion-exchangeable borosilicate glass may include greater than or equal to 72 mol % and less than or equal to 82 mol % $SiO_2$; greater than or equal to 1 mol % and less than or equal to 6 mol % $Al_2O_3$; greater than or equal to 3 mol % and less than or equal to 16 mol % $B_2O_3$; greater than or equal to 5 mol % and less than or equal to 12 mol % $Na_2O$; greater than or equal to 0.30 mol % and less than or equal to 1.5 mol % $K_2O$; greater than or equal to 0.10 mol % and less than or equal to 6.00 mol % MgO; and greater than or equal to 0.50 mol % and less than or equal to 4.0 mol % CaO. The ion-exchangeable borosilicate glass may be capable of being strengthened by ion-exchange and may have a thickness t. The concentration(s) of the constituent components of the ion-exchangeable borosilicate glass may be such that: 13≤0.0308543*(188.5+((23.84*Al2O3)+(−16.97*B2O3)+(69.10*Na2O)+(−213.3*K2O))+((Na2O−7.274)2*(−7.3628)+(Al2O3−2.863)*(K2O−0.520)*(321.5)+(B2O3−9.668)*(K2O−0.520)*(−39.74)))/t. These glasses are described in U.S. Provisional Patent Application No. 62/718,213, filed Aug. 13, 2018, by Robert Anthony Schaut, et al., and entitled "Ion Exchangeable Borosilicate Glass Compositions and Glass Articles Formed from the Same," the contents of which are incorporated herein by reference in their entirety.

In some embodiments, the alkali aluminosilicate glasses described hereinabove may be down-drawable by processes known in the art, such as slot-drawing, fusion drawing, re-drawing, and the like, and may have a liquidus viscosity of at least 130 kilopoise. In some embodiments, the alkali aluminosilicate glasses described hereinabove may be suitable for tube drawing and re-forming from tubes and the like and may have a liquidus viscosity of at least 10 kilopoise and, in some embodiments, at least about 40 kilopoise.

The glass articles strengthened by the method disclosed herein may be used for glass containers, such as pharmaceutical containers, having the mechanical strength to resist external damage but do not experience destruction of the glass article in response to flaws penetrating into the central region or all the way through the thickness of the glass. Although a through crack may expose the composition, such as a pharmaceutical composition, to the atmosphere, which may violate the integrity of the composition, the container may remain intact and capable of containing the composition. Thus, the contents may be retained in the glass container, despite the through crack, to enable the contents to be available when needed. As used herein, terms such as "container" and "vessel" refer to any article that is adapted to hold a solid or fluid for storage. The container may, in some embodiments, be sealable. The glass articles may be used for containers or vessels, such as vials for holding sterile substances such as a vaccine, biologic, pharmaceutical, foodstuff, solution, or the like. Non-limiting examples of such containers include glass vials, bottles, food jars, cartridges, syringes, ampules, or the like. The glass articles strengthened by the methods disclosed herein may also be used for other articles, such as cover glass for personal electronics or strengthened glass for aerospace or automotive applications, for example.

Test Methods

Compressive Stress and DOC

Compressive stress and DOC may be measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of compression are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Potassium Concentration Profile

The composition of the glass, in particular the concentration profile of potassium ions in the glass as a function of depth within the glass, can be determined using electron probe micro-analysis (EPMA) using an electron probe microanalyzer.

Surface Hydrolytic Resistance (SHR)

The chemical durability of the glass can be determined by conducting surface hydrolytic resistance (SHR) testing according to the hydrolytic testing methods known in the art and described in United States Pharmacopeial Convention (USP) 600, which are incorporated by reference herein in their entirety. The results of the surface hydrolytic resistance testing under USP 600 are reported as the amount of hydrochloric acid (HCl) consumption needed to titrate the volume of water in the container and is given in units of milliliters (mL) of 0.01 Molar (M) HCl per 100 milliliters (mL) of water.

Cone Crush Test

Figure 5:
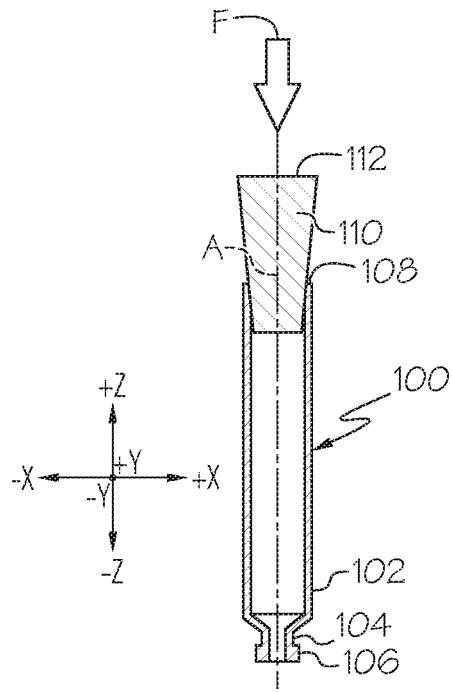
FIG. 5 schematically depicts a cone crush test for evaluating the mechanical strength of a glass article, such as a container, according to one or more embodiments shown and described herein.

The mechanical strength of the glass articles, such as cartridges for pharmaceutical compositions, may be evaluated by conducting a cone crush test. Referring to FIG. 5, the cone crush test for evaluating the mechanical strength of a glass cartridge 100 is depicted. The glass cartridge 100 includes a sidewall 102, a neck 104, a flange 106, and an open end 108 opposite the neck 104 and flange 106. The cone crush test includes placing a conical or frustoconical stopper 110 into the open end 108 of the cartridge 100 and applying a force F to the end 112 of the stopper 110 protruding from the cartridge 100 in a direction parallel to the center axis A of the cartridge (i.e., in the −Z direction of the coordinate axis in FIG. 5). The force F is increased until the cartridge 100 fails at the open end 108, and the force F required to produce failure is recorded. Standard equipment may be utilized to apply and measure the force F. The cone crush test may be performed on any container or article that includes an open end, such as a cartridge, syringe, or other open ended article.

Horizontal Compression Test

Figure 6:
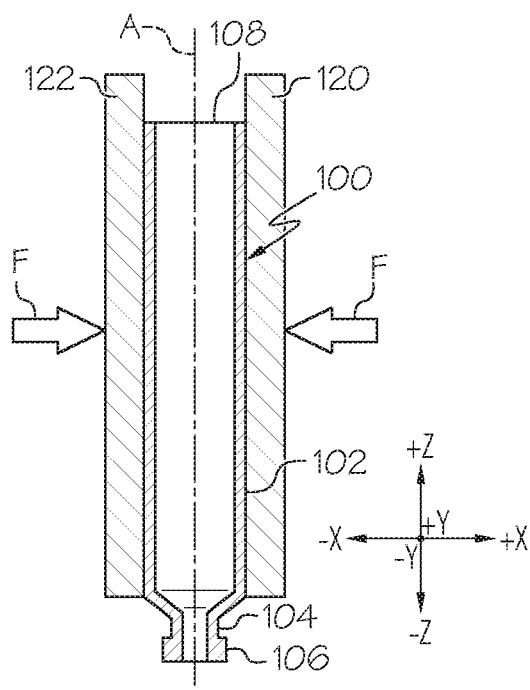
FIG. 6 schematically depicts a horizontal compression test for evaluating the mechanical strength of a glass article, such as a container, according to one or more embodiments shown and described herein.

The mechanical strength of the glass articles, such as cartridges for pharmaceutical compositions, may also be evaluated by conducting a horizontal compression test. Referring to FIG. 6, the horizontal compression test may include positioning the cartridge 100 between a first plate 120 and a second plate 122 and applying opposing forces F to the first plate 120 and second plate 122 at a point midway between the flange 106 and the open end 108 of the cartridge 100. The forces F are applied in a direction normal to the sidewall 102 (i.e., in the +/−X or +/−Y direction of the coordinate axis of FIG. 6 and perpendicular to the center axis A). The force F is increased until the cartridge 100 fails, and the force F required to produce failure is recorded. Standard equipment may be utilized to apply and measure the force F. The horizontal compression test may be performed on cartridges, vials, syringes, ampoules, jars, containers, or other articles.

Cartridge Cantilever Test

Figure 7:
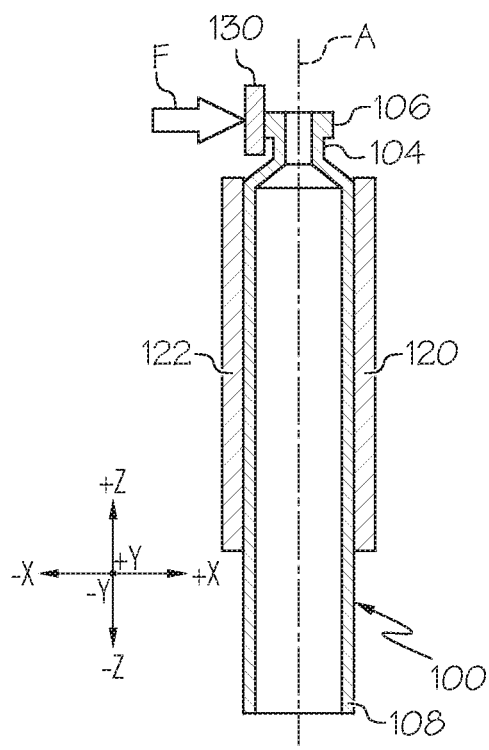
FIG. 7 schematically depicts a cantilever cartridge test for evaluating the mechanical strength of a glass article, such as a container, according to one or more embodiments shown and described herein.

The mechanical strength of the glass articles, such as cartridge 100, may also be evaluated by conducting a cartridge cantilever test. Referring to FIG. 7, the cartridge cantilever test may include securing the cartridge 100 in a fixed position between the first plate 120 and the second plate 122 in contact with the sidewalls 102 of the cartridge 100. A third plate 130 is placed against the flange 106, and a force F is applied to the third plate 130 in a direction normal to the outer surface of the flange 106 (i.e., in the +/−X or +/−Y direction of the coordinate axis of FIG. 6 and perpendicular to the center axis A). The force F is increased until the cartridge 100 fails at the neck 104, and the force F required to produce the failure is recorded. Standard equipment may be utilized to apply and measure the force F. The horizontal compression test may be performed on cartridges, as well as vials and other articles having a neck and flange structure at one end.

Barrel Crush Test

Figure 8:
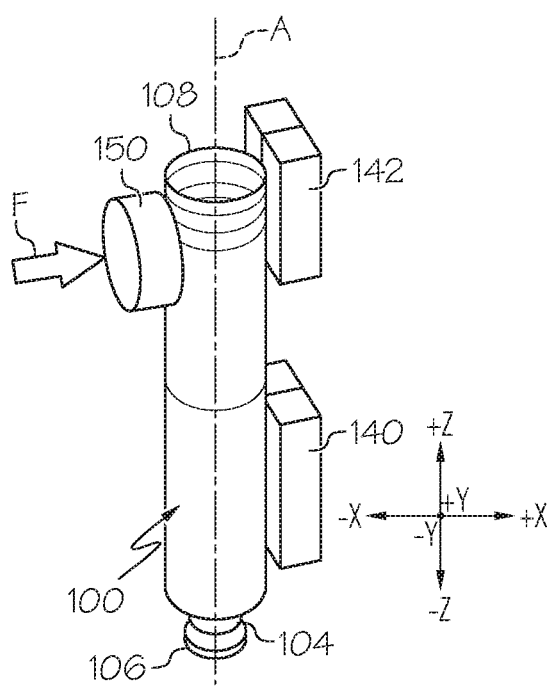
FIG. 8 schematically depicts a barrel crush test for evaluating the mechanical strength of a glass article, such as a container, according to one or more embodiments shown and described herein.

The mechanical strength of the glass articles, such as cartridge 100 or other container, may also be evaluated by conducting a barrel crush test. Referring to FIG. 8, the barrel crush test may include supporting the cartridge 100 or other container by a first support plate 140 proximate the neck 104 and flange 106 and a second support plate 142 positioned proximate the open end 108 of the cartridge 100 and on the same side of the cartridge 100 as the first support plate 140. A third plate 150 is placed against the sidewall 102 proximate the open end 108 of the cartridge 100 and opposite the second support plate 142. Force F is then applied to the third plate 150 in a direction normal to the outer surface of the sidewall 102 and perpendicular to the surface of the second support plate 142 (i.e., in the +/−X direction of the coordinate axis of FIG. 6 and perpendicular to the center axis A). The force F is increased until the barrel of the cartridge 100 proximate the open end 108 failed, and the force F required to produce the failure is recorded. Standard equipment may be utilized to apply and measure the force F. The horizontal compression test may be performed on cartridges, as well as vials and other articles having a neck and flange structure at one end.

EXAMPLES

The following examples illustrate the features and advantages of the glasses described herein and are in no way intended to limit the disclosure or appended claims thereto.

Example 1: Alkali Aluminosilicate Glass Cartridges Strengthened by the Three-Stage Strengthening Method In Example 1, alkali aluminosilicate glass articles were strengthened by the three-stage strengthening method of the present disclosure. The alkali aluminosilicate glass articles were 10.95 mm cartridges having a sidewall glass thickness of 0.85 mm. The glass cartridges were submersed in an initial ion-exchange bath that included potassium nitrate ($KNO_3$) maintained at the initial ion-exchange temperature of 400° C. for an initial ion-exchange time of 1 hr. The glass cartridges were removed from the initial ion-exchange bath, dip rinsed, and placed in an oven, in which the glass cartridges were subjected to a thermal treatment temperature of 400° C. for a thermal treatment time of 20 hrs. The glass cartridges were removed from the oven and submersed in a final ion exchange bath comprising $KNO_3$ maintained at a final ion-exchange temperature of 400° C. for a final ion-exchange time of 1 hrs. Following removal from the final ion-exchange process, the alkali aluminosilicate glass cartridges of Example 1 were dip rinsed and washed to remove residual ion-exchange reagents from the surfaces of the cartridges.

Comparative Example 2: Commercially-Available Borosilicate Glass Cartridges Strengthened by a Single Stage Ion Exchange Process In Comparative Example 2, commercially-available borosilicate glass cartridges were obtained for comparison to the strengthened cartridges of Example 1. The borosilicate glass cartridges of Comparative Example 2 were 10.95 mm cartridges having a glass thickness at the sidewall of 0.85 mm. The commercially-available borosilicate glass cartridges of Comparative Example 2 were strengthened by a single ion-exchange process introducing potassium ions into the borosilicate glass to the depth of layer.

Comparative Example 3: Alkali Aluminosilicate Glass Strengthened by a Single Stage Ion-Exchange Process In Comparative Example 3, alkali aluminosilicate glass cartridges were strengthened by a conventional single-stage ion-exchange process. The alkali aluminosilicate glass cartridges of Comparative Example 3 were 10.95 mm cartridges having a glass thickness at the sidewall of 0.85 mm. The alkali aluminosilicate glass cartridges of Comparative Example 3 were strengthened by submersing the glass cartridges in a single ion-exchange bath comprising $KNO_3$ maintained at an ion-exchange temperature of 470° C. and for a time of 5.5 hours. The alkali aluminosilicate glass cartridges were removed from the single ion-exchange bath and then dip rinsed and washed to remove the ion-exchange reagents from the surfaces of the cartridges.

Comparison of the Alkali Aluminosilicate Glass Cartridges of Example 1 to the Commercially-Available Borosilicate Glass Cartridges of Comparative Example 2 and the Alkali Aluminosilicate Glass Cartridges of Comparative Example 3

The potassium ion concentration profiles for the alkali aluminosilicate glass cartridges of Example 1, the borosilicate glass cartridges of Comparative Example 2, and the alkali aluminosilicate glass cartridges of Comparative Example 3 were determined by EPMA. Referring to FIG. 4, the potassium ion concentration as a function of depth in the glass (depth equals 0 at the surface) is depicted for the alkali aluminosilicate glass cartridges of Example 1 (406), the borosilicate glass cartridges of Comparative Example 2 (404), and the alkali aluminosilicate glass cartridges of Comparative Example 3 (402). As shown in FIG. 4, for the borosilicate cartridges of Comparative Example 2 (404) and alkali aluminosilicate glass cartridges of Comparative Example 3 (402), the concentration of potassium ions in the glass decreases with increasing depth at a consistent rate. In contrast, the potassium ion concentration profile for the aluminosilicate glass cartridges of Example 1 exhibits two distinct regions within the compression layer. First region 410 corresponds to the surface region of the glass and is characterized by a greater magnitude of the average slope of potassium ions as a function of depth. The second region 412 corresponds to the interior compression region between the surface region and the DOL (i.e., the depth to which the potassium concentration decreases to the bulk concentration of potassium ions in the glass). In the second region 412, the magnitude of the average slope of potassium ion concentration as a function of depth in the glass is less than the magnitude of the average slope in the first region 410.

FIG. 4 also shows that the concentration of potassium ions at the surface of the alkali aluminosilicate cartridges of Example 1 is less than the concentration of potassium ions at the surface of the alkali aluminosilicate cartridges of Comparative Example 3. Due to the relationship between compressive stress and concentration of potassium ions, it would be expected for the alkali aluminosilicate cartridges of Comparative Example 3 to have a greater compressive stress at the surface compared to the alkali aluminosilicate cartridges of Example 1 because of the greater potassium ion concentration. However, the CS determined at the surface of the alkali aluminosilicate cartridges of Example 1 was found to be greater than the CS determined at the surface of the alkali aluminosilicate cartridges of Comparative Example 3. Not intending to be bound by any particular theory, it is believed that the greater CS of the alkali aluminosilicate cartridges of Example 1 may be the result of reduced thermal relaxation in the glass. The final ion-exchange process for the alkali aluminosilicate cartridges of Example 1 was conducted at a temperature of 400° C. which resulted in less thermal relaxation compared to the alkali aluminosilicate cartridges of Comparative Example 3, which was ion-exchanged at a much greater temperature for a longer period of time. The greater thermal relaxation in the alkali aluminosilicate cartridges of Comparative Example 3 may have caused a reduction in the CS at the surface of the glass. This demonstrates that the three-stage strengthening process disclosed herein in which the final ion-exchange process is conducted at temperatures less than 400° C. may result in less thermal relaxation and greater CS compared to glass articles strengthened with a convention single-stage ion-exchange.

The CS and potassium ion concentration at the surface of the alkali aluminosilicate cartridges of Example 1 were both substantially greater than the CS and potassium ion concentration at the surface of the borosilicate glass cartridges of Comparative Example 2. The CS, DOL, and CT determined for the aluminosilicate cartridges of Example 1 and the borosilicate cartridges of Comparative Example 2 are provided in the following Table 1.

TABLE 1

CS, DOL, and CT for Cartidges of Example 1 and Comparative Example 2

|  | CS(MPa) | DOL(μm) | CT(MPa) |
|---|---|---|---|
| Example1 | 680 | 40 | 11 |
| Comparative Example 2 | 275 | 30 | 9 |

The DOL for the alkali aluminosilicate cartridges of Example 1 (407 in FIG. 4) was less than the DOL for the alkali aluminosilicate cartridges of Comparative Example 3 (403 in FIG. 4). However, the DOL for the alkali aluminosilicate cartridges of Comparative Example 2 was greater than 30 μm and sufficient to produce a DOC of at least 30 μm. The DOL (and, thus, the DOC) for the alkali aluminosilicate cartridges of Example 1 were also greater than the DOL for the borosilicate glass cartridges of Comparative Example 2 (ref no. 405 in FIG. 4). Thus, compared to commercially available borosilicate glass cartridges, such as those in Comparative Example 2, the alkali aluminosilicate glass cartridges of Example 1 strengthened by the three-stage strengthening process disclosed herein exhibit greater CS and greater DOC. The DOC for borosilicate glass articles can be increased by increasing the ion-exchange time, but the CS of borosilicate glass cannot be increased without making substantial changes to the glass composition.

Figure 9:
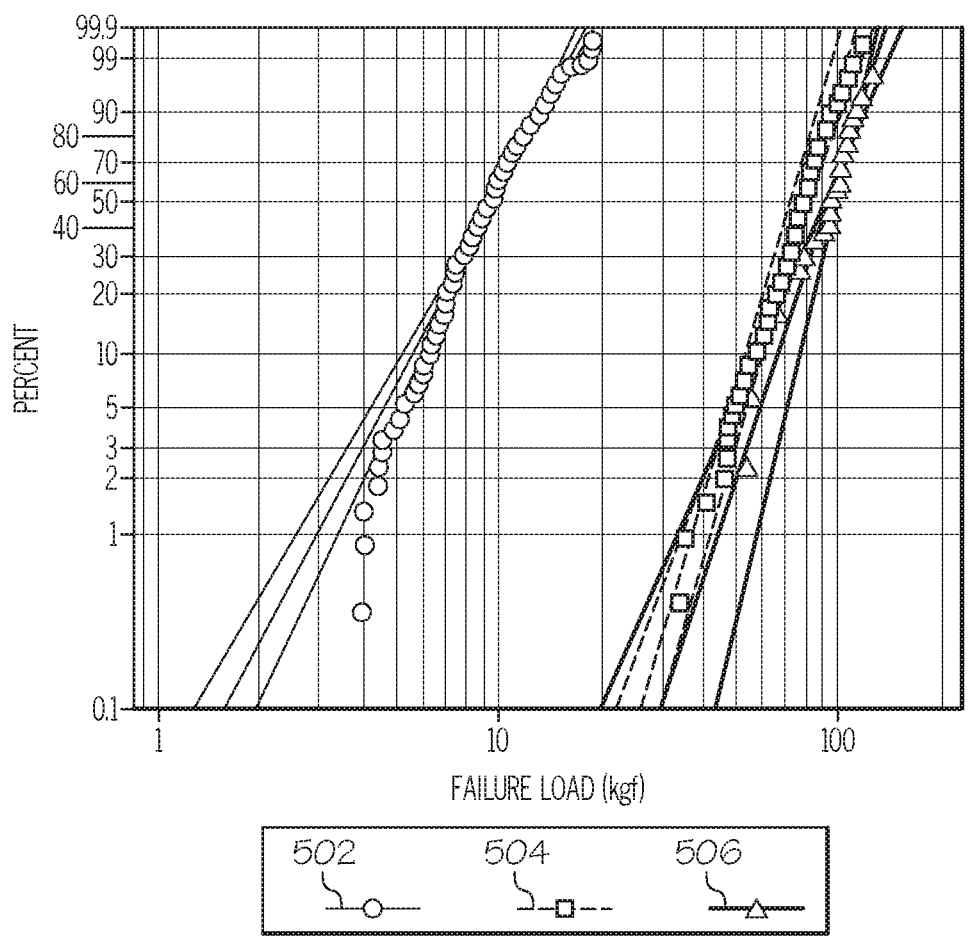
FIG. 9 graphically depicts a Weibull plot of failure load (x-axis) resulting from cone crush testing of borosilicate glass cartridges (Comparative Example 2), alkali aluminosilicate glass cartridges subjected to a single step ion exchange (Comparative Example 3), and alkali aluminosilicate glass cartridges strengthened by the disclosed method (Example 1), according to one or more embodiments shown and described herein.
Figure 10:
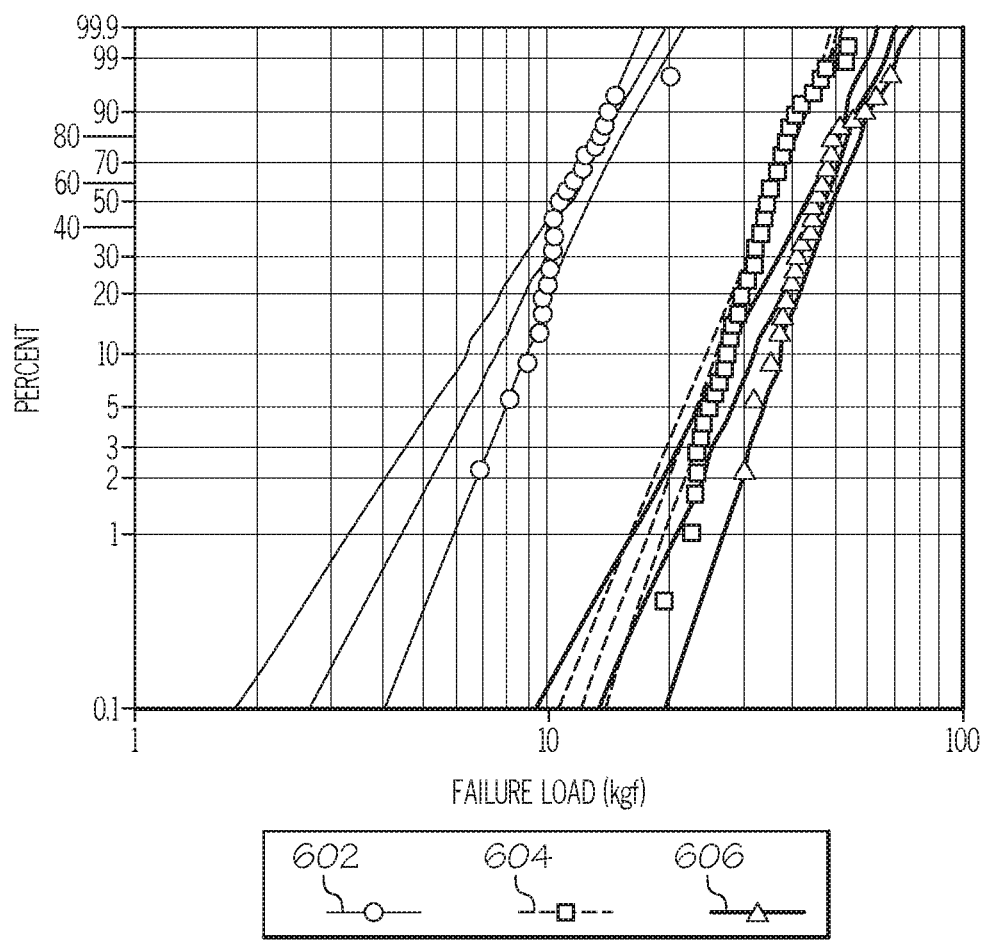
FIG. 10 graphically depicts a Weibull plot of failure load (x-axis) resulting from horizontal compression testing of borosilicate glass cartridges (Comparative Example 2), alkali aluminosilicate glass cartridges subjected to a single step ion exchange (Comparative Example 3), and alkali aluminosilicate glass cartridges strengthened by the disclosed method (Example 1), according to one or more embodiments shown and described herein.
Figure 11:
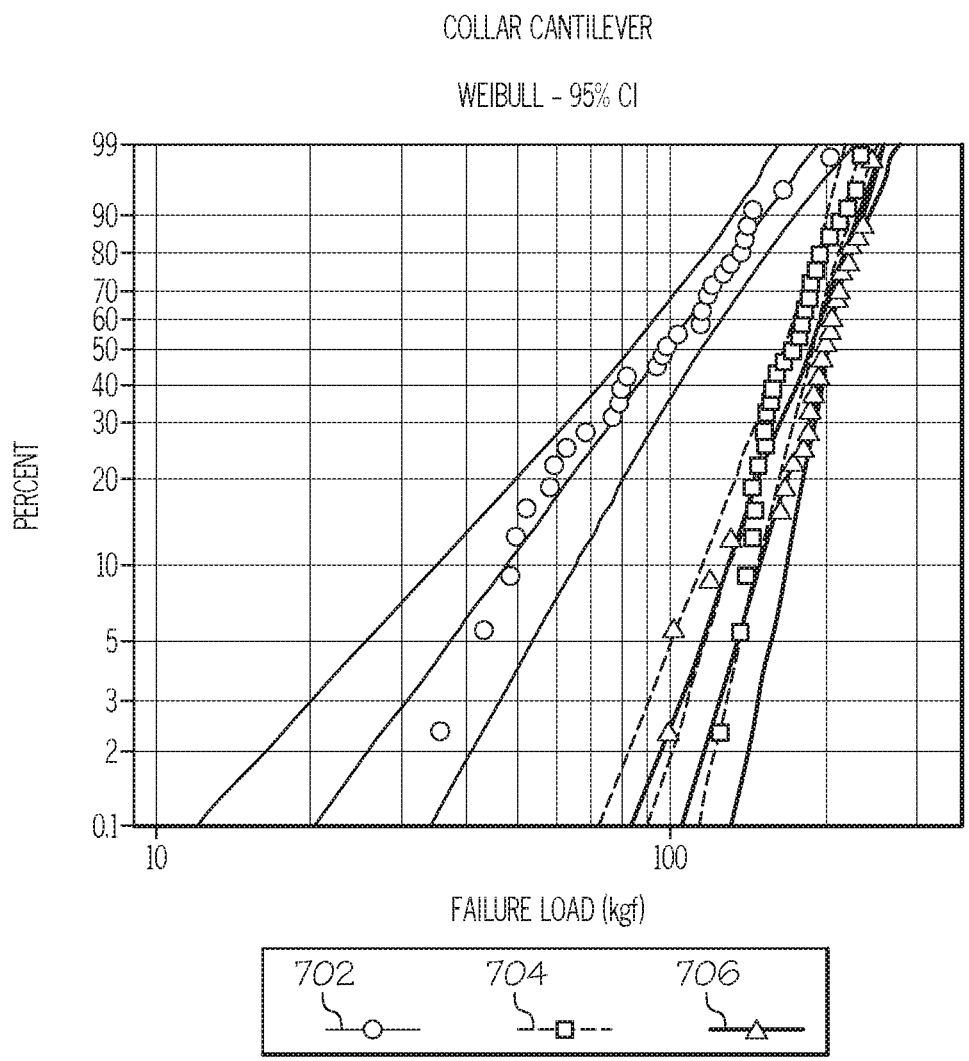
FIG. 11 graphically depicts a Weibull plot of failure load (x-axis) resulting from cantilever cartridge testing of borosilicate glass cartridges (Comparative Example 2), alkali aluminosilicate glass cartridges subjected to a single step ion exchange (Comparative Example 2), and alkali aluminosilicate glass cartridges strengthened by the disclosed method (Example 1), according to one or more embodiments shown and described herein.
Figure 12:
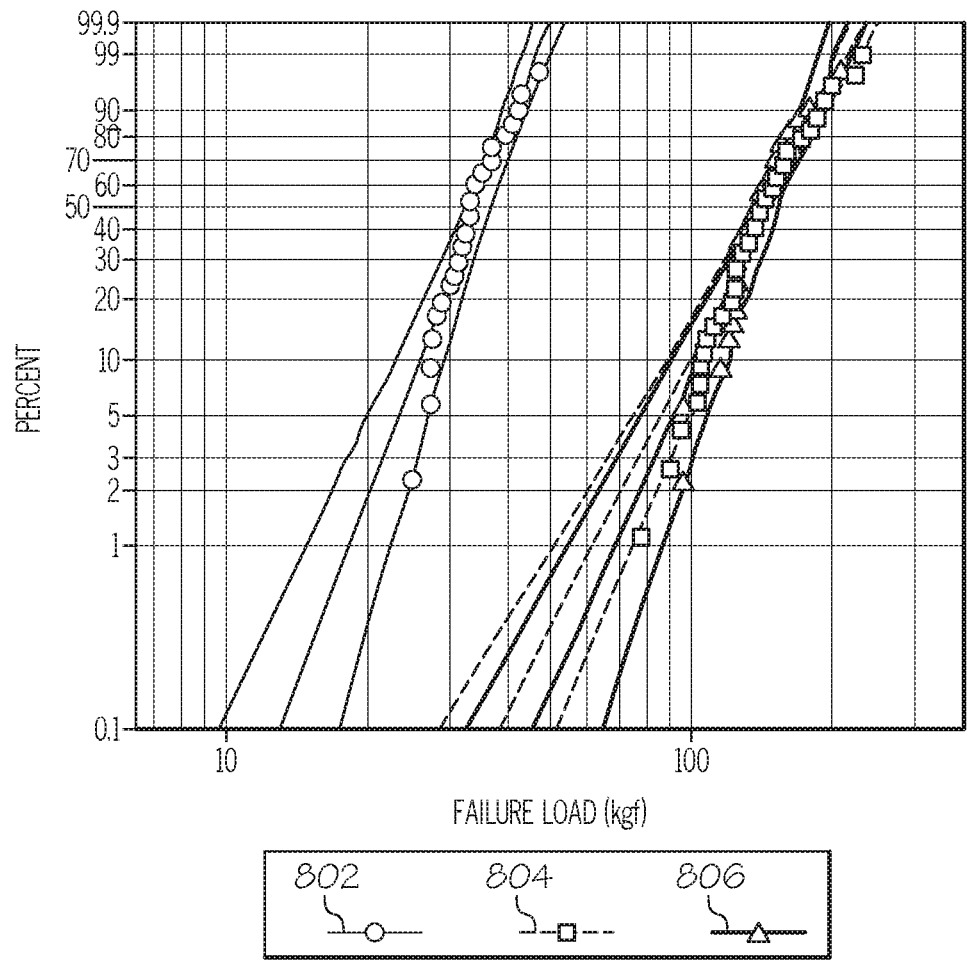
FIG. 12 graphically depicts a Weibull plot of failure load (x-axis) resulting from barrel crush testing of borosilicate glass cartridges (Comparative Example 2), alkali aluminosilicate glass cartridges subjected to a single step ion exchange (Comparative Example 3), and alkali aluminosilicate glass cartridges strengthened by the disclosed method (Example 1), according to one or more embodiments shown and described herein.

The mechanical strengths of the alkali aluminosilicate cartridges of Example 1, the borosilicate glass cartridges of Comparative Example 2, and the alkali aluminosilicate cartridges of Comparative Example 3 were evaluated by subjecting the cartridges to a cone crush test, horizontal compression test, cantilever cartridge test, and barrel crush test, as described herein. The results of these mechanical strength tests are presented in FIGS. 9-12, which are Weibull distribution plots of the failure load in kilograms of force (kg-f). The borosilicate cartridges of Comparative Example 2 are represented by data series 502 in FIG. 9, data series 602 in FIG. 10, data series 702 in FIG. 11, and data series 802 in FIG. 12. The alkali aluminosilicate cartridges of Comparative Example 3 are represented by data series 504 in FIG. 9, data series 604 in FIG. 10, data series 704 in FIG. 11, and data series 804 in FIG. 12. The alkali aluminosilicate cartridges of Example 1 are represented by data series 506 in FIG. 9, data series 606 in FIG. 10, data series 706 in FIG. 11, and data series 806 in FIG. 12.

As shown in FIGS. 9-12, the alkali aluminosilicate cartridge of Example 1 strengthened by the three-stage method disclosed herein exhibited substantially greater mechanical strength compared to the commercially-available borosilicate cartridges of Comparative Example 2 in each of the cone crush, horizontal compression, cantilever cartridge, and barrel crush tests. Also, the alkali aluminosilicate cartridge of Example 1 exhibited mechanical strength comparable to and even slightly superior to the alkali aluminosilicate cartridges of Comparative Example 3, which were strengthened by a single-stage ion-exchange process. Thus, FIGS. 9-12 demonstrate that the three-stage strengthening process comprising a first ion-exchange, a thermal treatment, and a final ion-exchange can produce glass articles having equivalent or even superior mechanical strength compared to alkali aluminosilicate glass articles strengthened by a single ion-exchange process and substantially superior to the mechanical strength of commercially available borosilicate glass articles.

Example 4: Effects of Thermal Treatment Conditions on Potassium Concentration Profile in the Glass and Mechanical Performance of the Glass Cartridges In Example 4, the influence on the thermal treatment conditions on the potassium ion concentration profile in the glass and on the mechanical performance of glass cartridges were investigated. For Example 4, 10.95 mm alkali aluminosilicate glass cartridges having a glass thickness at the sidewall of 0.85 mm were subjected to the three-stage strengthening process of the present disclosure. The first ion-exchange process and the final ion-exchange process were maintained constant and the thermal treatment time and the thermal treatment temperature were varied. The thermal treatment time and thermal treatment temperature for Examples 4A, 4B, 4C, and 4D are provided below in Table 2.

TABLE 2

Thermal Treatment Conditions for Example 4

Figure 13:
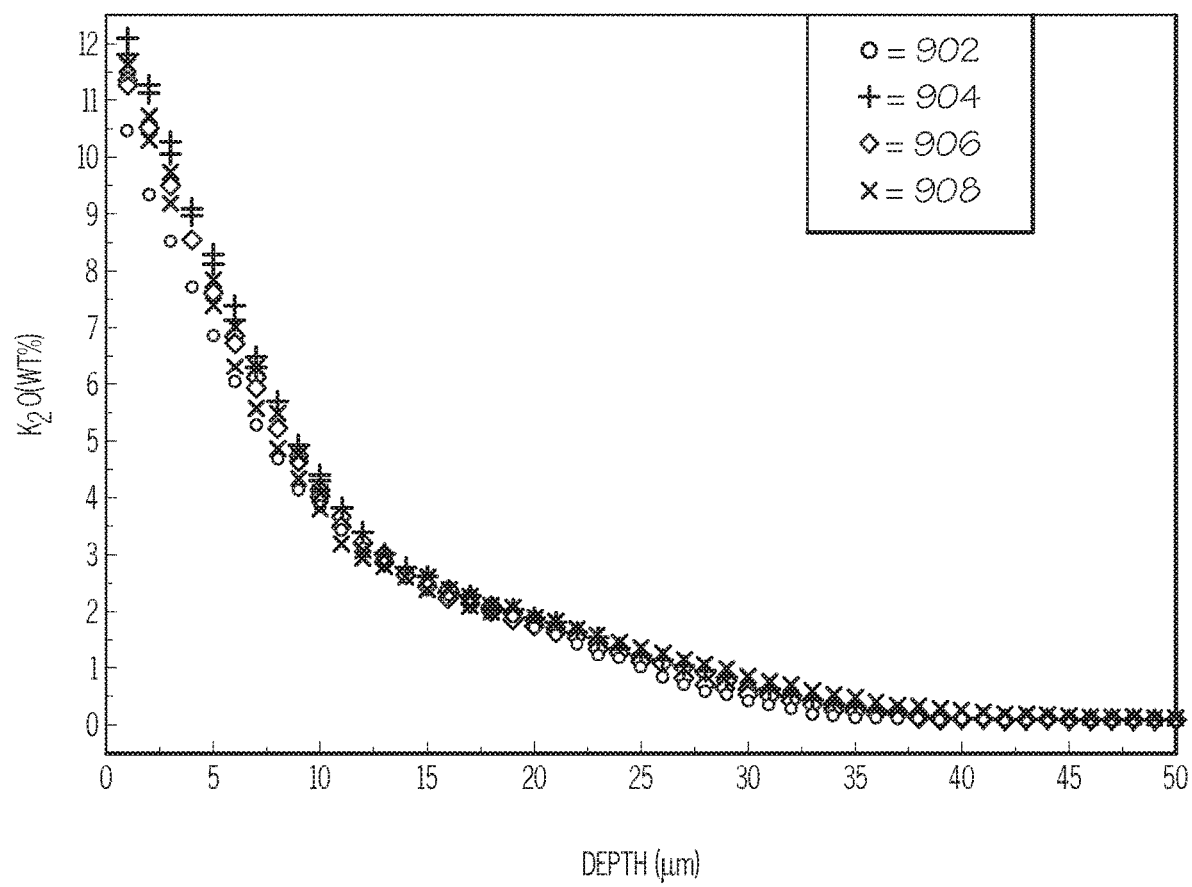
FIG. 13 graphically depicts a concentration of potassium oxide (y-axis) as a function of depth from a surface of alkali aluminosilicate glass cartridges strengthened by the method of FIG. 3 in which the thermal treatment temperatures and thermal treatment times are varied (Example 4), according to one or more embodiments shown and described herein.
Figure 14:
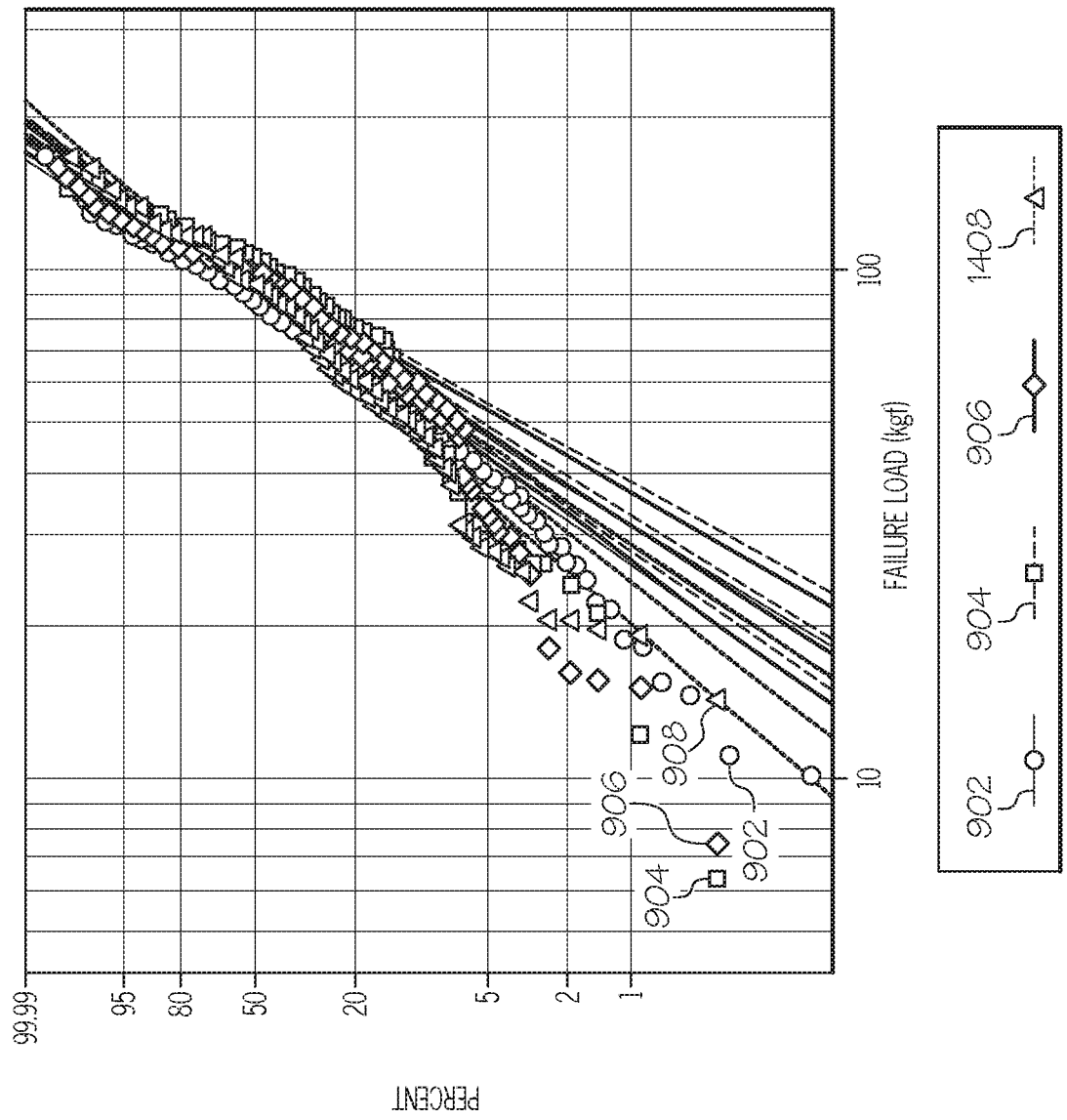
FIG. 14 graphically depicts a Weibull plot of failure load (x-axis) for the alkali aluminosilicate glass cartridges strengthened by the method of FIG. 3 in which the thermal treatment temperatures and thermal treatment times are varied (Example 4), according to one or more embodiments shown and described herein.

| Example ID | Data Series in FIGS. 13 and 14 | Thermal Treatment Temperature (° C.) | Thermal Treatment Time (hr) |
|---|---|---|---|
| 4A | 902 | 400 | 20 |
| 4B | 904 | 470 | 3.5 |
| 4C | 906 | 485 | 3 |
| 4D | 908 | 500 | 2.5 |

For each of Examples 4A, 4B, 4C, and 4D, the potassium ion concentration profile was determined using EPMA, and the results are presented in FIG. 13. As shown in FIG. 13, the potassium ion concentration profile for Examples 4A, 4B, 4C, and 4D are all similar, with similar depths of layer at around 40 μm to 45 μm. FIG. 13 demonstrates the relationship between the thermal treatment temperature and thermal treatment time and shows that the same potassium ion concentration profile with the same depth of layer can be obtained at different thermal treatment temperatures by changing the thermal treatment time accordingly. Thus, the thermal treatment temperature and the thermal treatment time can be modified to balance reduced thermal relaxation with the processing time.

The cartridges of Examples 4A, 4B, 4C, and 4D were also subjected to the cone crush test to evaluate the effects of thermal treatment conditions on the mechanical strength of the glass cartridges. The cone crush test results are shown in FIG. 14, which is a Weibull plot of the failure load in kilograms of force for each of Examples 4A, 4B, 4C, and 4D. As shown in FIG. 14, the cartridges for each of Examples 4A, 4B, 4C, and 4D exhibited similar mechanical strength performance as evaluated by the cone crush test, which indicates that the thermal treatment conditions by themselves may not have a great effect on the mechanical strength of the glass articles strengthened by the three-stage strengthening process of the present disclosure. Thus, the mechanical strength of the glass articles produced by the disclosed method may not be highly sensitive to changes in the thermal treatment conditions.

Comparative Example 5: Unstrengthened Borosilicate Cartridges

For Comparative Example 5, commercially available unstrengthened borosilicate glass cartridges were obtained. The unstrengthened borosilicate glass cartridges of Comparative Example 5 were 10.95 mm borosilicate cartridges. The unstrengthened borosilicate glass cartridges of Comparative Example 5 were not subjected to a strengthening process.

Comparative Example 6: Borosilicate Cartridges Strengthened by a Single Ion-Exchange Process In Comparative Example 6, a subset of the commercially available unstrengthened borosilicate glass cartridges of Comparative Example 5 were subjected to a single-stage ion-exchange strengthening process to produce strengthened borosilicate glass cartridges. In particular, the subset of borosilicate glass cartridges of Comparative Example 6 were immersed in an ion-exchange bath comprising $KNO_3$ maintained at a temperature of 470° C. The borosilicate glass cartridges were immersed in the ion-exchange bath for an ion-exchange time of 20 hours. After 20 hours, the strengthened borosilicate glass cartridges of Comparative Example 6 were removed and rinsed to remove the excess ion-exchange reagents.

Example 7: Effects of the Ion-Exchange Conditions of the Initial Ion Exchange and the Final Ion-Exchange on the Mechanical Strength of the Alkali Aluminosilicate Glass Cartridges Strengthened According to the Disclosed Method of Strengthening Glass Articles In Example 7, the effects of the ion-exchange conditions in the initial ion-exchange and the final ion-exchange processes on the mechanical strength of alkali aluminosilicate glass cartridges subjected to the three-stage method of strengthening disclosed herein were evaluated. In Example 7, 10.95 mm alkali aluminosilicate glass cartridges having a glass thickness of 0.85 mm were subjected to the three-stage method of strengthening glass articles disclosed herein. The thermal treatment time and thermal treatment temperature during the thermal treatment step were maintained constant throughout each of Examples 7A, 7B, 7C, 7D, 7E, 7F, and 7G.

For Examples 7A, 7B, 7C, and 7D, the final ion-exchange temperature was constant at 400° C., and the final ion-exchange time was maintained constant at 0.333 hours (20 minutes). The initial ion-exchange temperatures and initial ion-exchange times of the initial ion-exchange process for Examples 7A, 7B, 7C, and 7D are provided below in Table 3. For Examples 7E, 7F, and 7G, the initial ion-exchange temperature and initial ion-exchange time were maintained at 400° C. and 1 hour (60 min), respectively. The final ion-exchange temperatures and final ion-exchange times of the final ion-exchange process for Examples 7E, 7F, and 7G are provided below in Table 3.

TABLE 3

Initial Ion-Exchange and Final Ion-Exchange Conditions for Comparative Example 5, Comparative Example 6, and Example 7.

Figure 15:
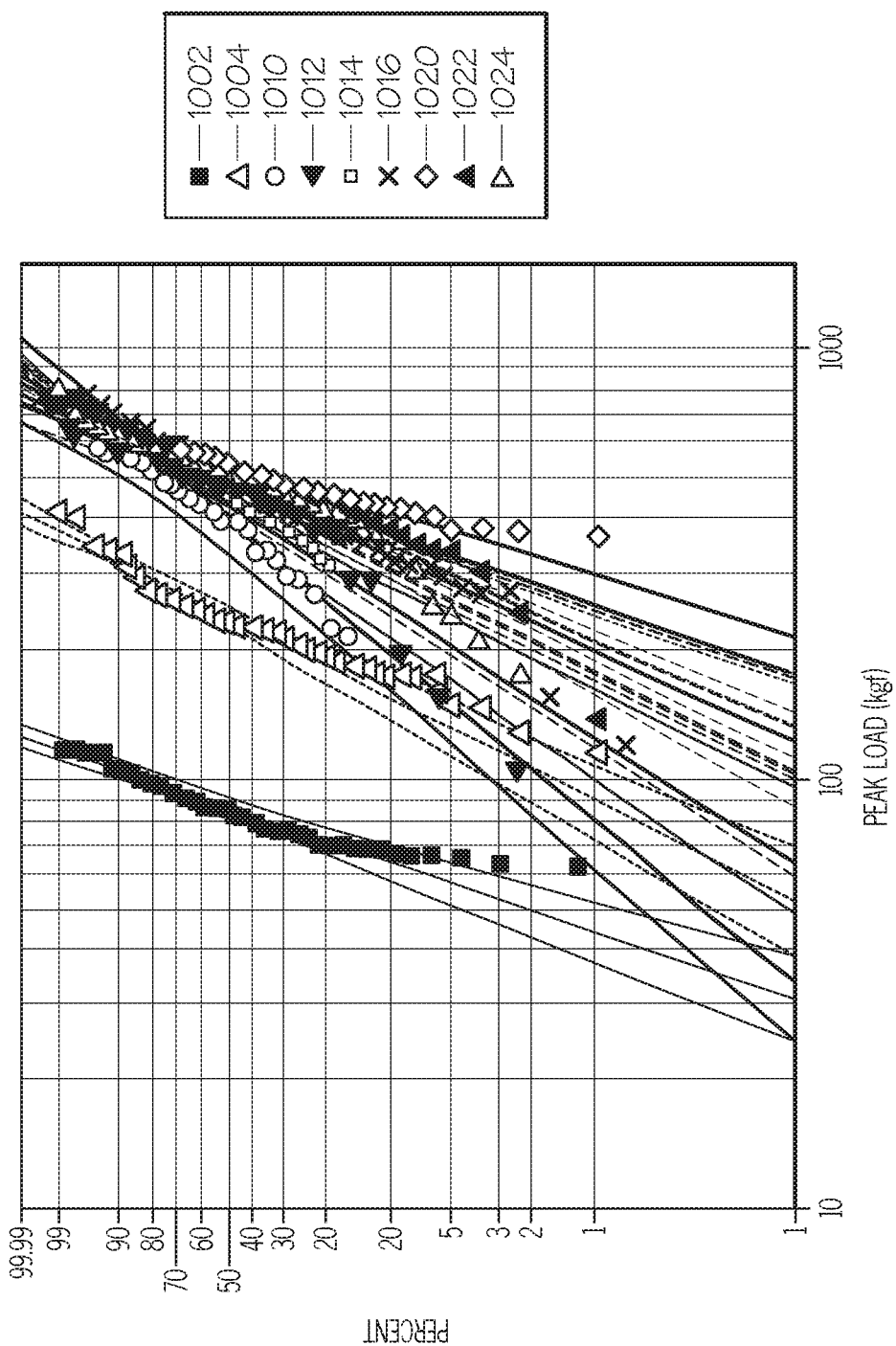
FIG. 15 graphically depicts a Weibull plot of failure load (x-axis) resulting from horizontal compression testing of the unstrengthened borosilicate glass cartridges of Comparative Example 5, the strengthened borosilicate glass cartridges of Comparative Example 6, and the strengthened alkali aluminosilicate glass cartridges of Example 7, for which the ion-exchange conditions for the initial ion-exchange process and final ion-exchange process were varied, according to one or more embodiments shown and described herein.
Figure 16:
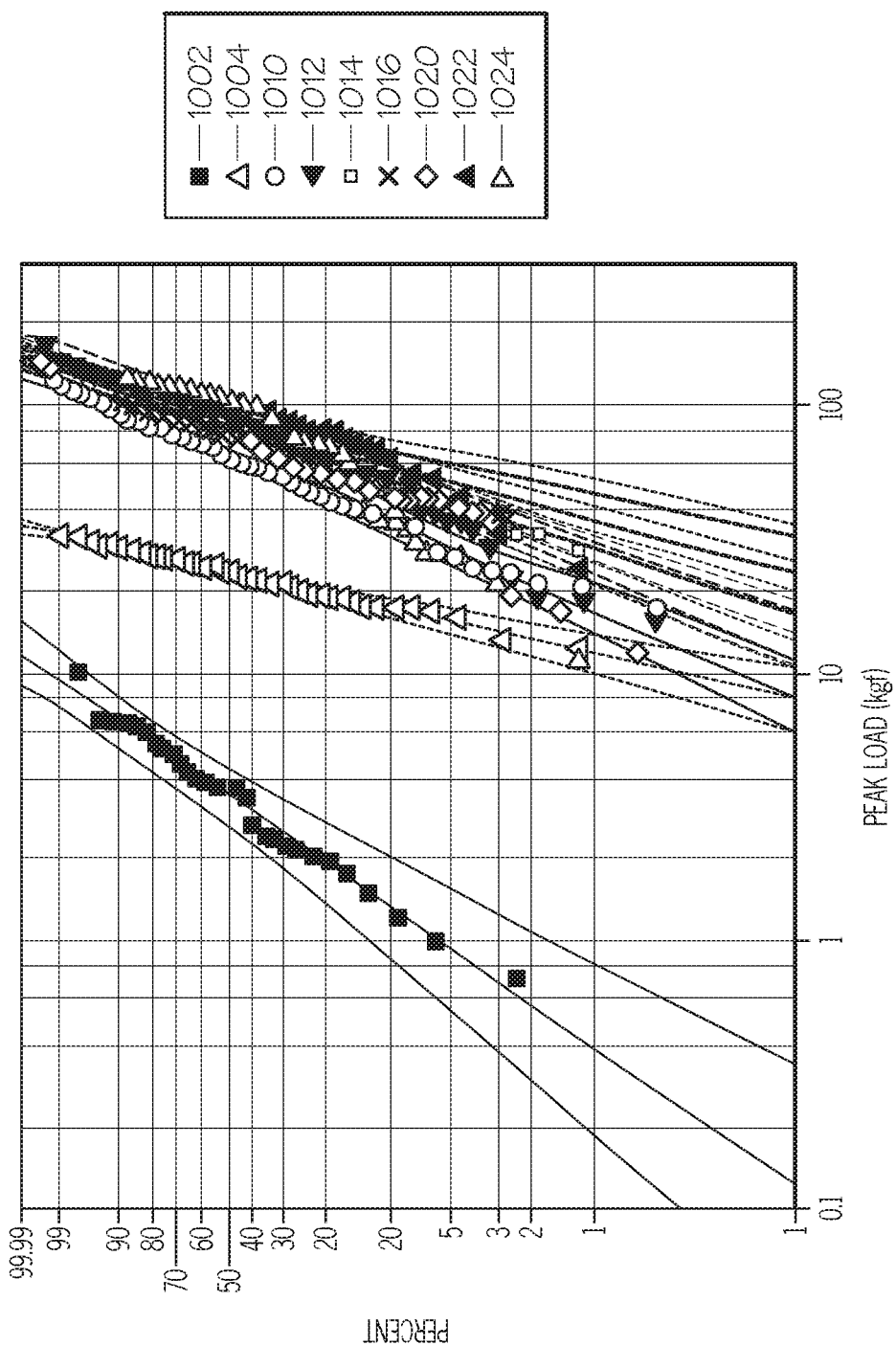
FIG. 16 graphically depicts a Weibull plot of failure load (x-axis) resulting from cone crush testing of the unstrengthened borosilicate glass cartridges of Comparative Example 5, the strengthened borosilicate glass cartridges of Comparative Example 6, and the strengthened alkali aluminosilicate glass cartridges of Example 7, for which the ion-exchange conditions for the initial ion-exchange process and final ion-exchange process were varied, according to one or more embodiments shown and described herein.

| Example ID | Ref No. in FIGS. 15 and 16 | Initial IOX Temperature (° C.) | Initial IOX Time (hr/min) | Final IOX Temperature (° C.) | Final IOX Time (hr/min) |
|---|---|---|---|---|---|
| Comp Ex. 5 | 1002 | — | — | — | — |
| Comp Ex. 6 | 1004 | 470* | 20* | — | — |
| 7A | 1010 | 400 | 0.25/15 | 400 | 0.333/20 |
| 7B | 1012 | 400 | 0.5/30 | 400 | 0.333/20 |
| 7C | 1014 | 400 | 0.75/45 | 400 | 0.333/20 |
| 7D | 1016 | 400 | 1.0/60 | 400 | 0.333/20 |
| 7E | 1020 | 400 | 1.0/60 | 400 | 0.5/30 |
| 7F | 1022 | 400 | 1.0/60 | 400 | 0.75/45 |
| 7G | 1024 | 400 | 1.0/60 | 400 | 1.0/60 |

*Cartridges of Comparative Example 6 were subjected to a single ion-exchange process and not subjected to the thermal treatment or the final ion-exchange process.

The cartridges of Examples 7A through 7G, Comparative Example 5, and Comparative Example 6 were subjected to horizontal compression test and cone crush testing to evaluate the effects of the ion-exchange conditions in the initial ion-exchange process and final ion-exchange process on the mechanical strength of the glass cartridges. The results of the horizontal compression tests are provided in FIG. 15, which is a Weibull plot of the failure load in kilograms of force for each of Examples 7A through 7G, Comparative Example 5, and Comparative Example 6. The results of the cone crush test are shown in FIG. 16, which is a Weibull plot of the failure load in kilograms of force for each of Examples 7A through 7G, Comparative Example 5, and Comparative Example 6.

As shown in FIGS. 15 and 16, the alkali aluminosilicate glass cartridges of Examples 7A through 7G, which were strengthened by the disclosed three-stage strengthening method, exhibited superior mechanical strength compared to the unstrengthened borosilicate glass cartridges of Comparative Example 5 and the strengthened glass cartridges of Comparative Example 6.

FIGS. 15 and 16 also indicate that variability in the mechanical strength of the alkali aluminosilicate glass cartridges strengthened by the disclosed method increases with decreasing initial ion-exchange time. The degree of variability in the mechanical strength of the alkali aluminosilicate glass cartridges strengthened by the disclosed method in response to changes in final ion-exchange time are less than the variability resulting from changes in initial ion-exchange time.

Examples 8: Alkali Aluminosilicate Glass Cartridges Strengthened by the Three-Stage Strengthening Method In Example 8, strengthened alkali aluminosilicate glass cartridges were prepared for hydrolytic testing. For Samples 8A, 8B, 8C, 8D, and 8E (8A-8E), 10.95 mm cartridges were strengthened by subjecting the cartridges to the three-stage method of strengthening. For Samples 8F, 8G, 8H, 8I, and 8J (8F-8J), 11.6 mm cartridges were strengthened according to the three-stage method of strengthening. The thermal treatment was maintained constant for each of Samples 8A-8J. The initial ion-exchange temperature, initial ion-exchange time, final ion-exchange temperature, and final ion-exchange time for each of Samples 8A-8J are provided below in Table 4.

TABLE 4

Initial Ion-Exchange and Final Ion-Exchange Conditions for Example 8

| Example ID | Cartridge Size (mm) | Initial IOX Temperature (° C.) | Initial IOX Time (hr/min) | Final IOX Temperature (° C.) | Final IOX Time (hr/min) |
|---|---|---|---|---|---|
| 8A | 10.95 | 400 | 1/60 | 400 | 0.0167/1 |
| 8B | 10.95 | 400 | 1/60 | 400 | 0.333/20 |
| 8C | 10.95 | 400 | 1/60 | 400 | 0.5/30 |
| 8D | 10.95 | 400 | 1/60 | 400 | 0.75/45 |
| 8E | 10.95 | 400 | 1/60 | 400 | 1.0/60 |
| 8F | 11.6 | 400 | 1/60 | 400 | 0.0167/1 |
| 8G | 11.6 | 400 | 1/60 | 400 | 0.333/20 |
| 8H | 11.6 | 400 | 1/60 | 400 | 0.5/30 |
| 8I | 11.6 | 400 | 1/60 | 400 | 0.75/45 |
| 8J | 11.6 | 400 | 1/60 | 400 | 1.0/60 |

Comparative Example 9: Alkali Aluminosilicate Glass Cartridges Strengthened by a Single-Step Ion Exchange In Comparative Example 9, alkali aluminosilicate glass cartridges were prepared for hydrolytic testing by strengthening the cartridges by a single-step ion-exchange process. For Samples CE9A, CE9B, and CE9C, 10.95 mm cartridges were strengthened, and for Samples CE9D, CE9E, and CE9F, 11.6 mm cartridges were strengthened. The ion-exchange temperature of the single ion-exchange process was 470° C. and the ion-exchange time was 1 hour for Samples CE9A and CE9D, 4 hours for Samples CE9B and CE9E, and 7 hours for Samples CE9C and CE9F Example 10: Surface Hydrolytic Resistance (SHR) of the Alkali Aluminosilicate Glass Cartridges of Example 8 and Comparative Example 9

Figure 17:
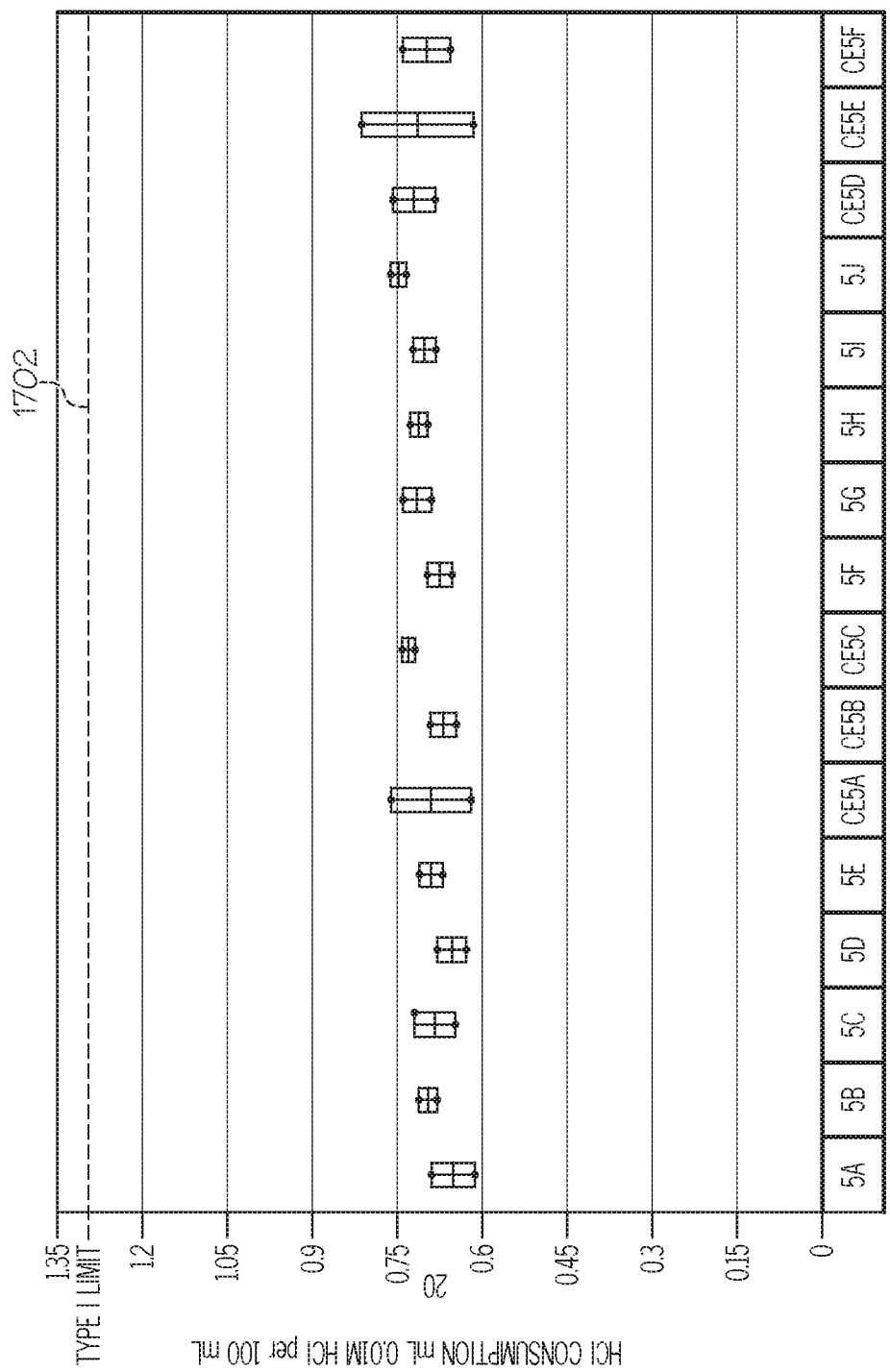
FIG. 17 graphically depicts surface hydrolytic resistance (SHR) testing results (y-axis) for the alkali aluminosilicate glass cartridges of Example 8 and Comparative Example 9, according to one or more embodiments shown and described herein.

In Example 10, the alkali aluminosilicate glass cartridges of Example 8 (Samples 8A-8J) and Comparative Example 9 (Samples CE9A-CE9F) were subjected to hydrolytic testing to demonstrate that the three-stage method of strengthening glass articles produces glass articles that comply with the chemical sensitivity standards for Class 1B glass. The surface hydrolytic resistance testing was conducted according to the methods described in USP <600> and referenced herein. Referring to FIG. 17, the alkali aluminosilicate glass cartridges of Example 8 strengthened by the three-stage strengthening method disclosed herein exhibited SHR values well below the limit for Type 1 glass for pharmaceutical containers (line 1702 in FIG. 17) and comparable to the SHR exhibited by the alkali aluminosilicate glass cartridges of Comparative Example 9 strengthened by a single ion exchange step. Thus, the disclosed method of strengthening glass articles disclosed herein does not degrade the chemical durability of the glass composition and is capable of strengthening glass articles while maintaining compliance with the SHR standards for Type 1 glass for pharmaceutical containers.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of strengthening a glass article, the method comprising:
   introducing potassium ions into a surface region of a glass of the glass article by an initial ion-exchange process, the glass comprising a first surface, a second surface, and a thickness from the first surface to the second surface, wherein the surface region extends into the glass from the first surface, the second surface, or both;
   after introducing the potassium ions into the surface region of the glass, thermally treating the glass at a thermal treatment temperature and for a thermal treatment time sufficient to diffuse at least a portion of the potassium ions from the surface region into the glass to a depth in the glass that results in a depth of compression (DOC) of greater than or equal to 30 micrometers (μm); and
   after thermally treating the glass, introducing a compressive stress of greater than or equal to 400 megapascals (MPa) to the surface region of the glass by subjecting the glass to a second ion-exchange process under conditions sufficient to maintain a total central tension in the glass of less than 13 MPa,
   wherein after the second ion-exchange process, the glass article has a total central tension of less than 13 MPa,
   wherein the glass article is a container adapted to hold a pharmaceutical product, a vaccine, a biologic, a foodstuff, or a solution, and
   wherein a total ion-exchange time for the glass article is about 2 hours or less.

2. The method of claim 1, wherein the initial ion-exchange process comprises an initial ion-exchange temperature of greater than or equal to 400° C. and for an initial ion-exchange time sufficient to introduce an amount of potassium ions resulting in the DOC of greater than or equal to 30 μm and the total central tension of less than 13 MPa following the thermally treating the glass and introducing the compressive stress.

3. The method of claim 2, wherein the initial ion-exchange temperature is from 400° C. to 550° C. and the initial ion-exchange time is from 0.1 hours to 1.0 hours.

4. The method of claim 2, further comprising:
   determining the amount of the potassium ions to introduce to the surface region of the glass; and
   adjusting the initial ion-exchange temperature, the initial ion-exchange time, or both to introduce the determined amount of potassium ions into the surface region of the glass.

5. The method of claim 1, wherein the thermal treatment temperature is from 350° C. to 600° C.

6. The method of claim 1, wherein the thermal treatment time is from 1 hour to 24 hours.

7. The method of claim 1, wherein a final ion-exchange temperature of the ion-exchange process is less than or equal to 450° C.

8. The method of claim 7, wherein the final ion-exchange temperature is from 300° C. to 450° C.

9. The method of claim 1, wherein a final ion-exchange time of the ion-exchange process is from 0.1 hour to 1.0 hour.

10. The method of claim 1, wherein the surface region of the glass has a surface region thickness less than the DOC.

11. The method of claim 1, wherein the DOC is from 15% to 25% of the thickness of the glass.

12. The method of claim 1, wherein the thickness of the glass is less than or equal to 6 mm.

13. The method of claim 12, wherein the thickness of the glass is from 0.3 mm to 2.0 mm.

14. The method of claim 1, wherein the total central tension in the glass is from 8 MPa to 12 MPa.

15. The method of claim 1, wherein:
the surface region extends into the surface of the glass article to a depth of layer (DOL) that is less than the DOC;
the glass article comprises an interior compression region extending from the DOL to the DOC; and
the surface region and the interior compression region both have a concentration of potassium ions greater than a concentration of potassium ions in the central tension region.

16. The method of claim 1, wherein:
the glass article has a potassium ion concentration gradient from the surface to the DOC;
a magnitude of a slope of the potassium ion concentration gradient in the surface region is greater than a magnitude of a slope of the potassium ion concentration gradient in the interior compression region.

17. The method of claim 1, wherein the thickness of the glass article is from 0.3 mm to 1.5 mm and, after the second ion-exchange process, the DOC is greater than or equal to 40 μm and the compressive stress is greater than or equal to 500 MPa at the first surface and the second surface.

18. The method of claim 1, wherein the thickness of the glass article is from 0.3 mm to 1.2 mm.

19. A method of strengthening a glass article, the method consisting essentially of:
introducing potassium ions into a surface region of a glass of the glass article by an initial ion-exchange process, the glass comprising a first surface, a second surface, and a thickness from the first surface to the second surface, wherein the surface region extends into the glass from the first surface, the second surface, or both;
after introducing the potassium ions into the surface region of the glass, thermally treating the glass at a thermal treatment temperature and for a thermal treatment time sufficient to diffuse at least a portion of the potassium ions from the surface region into the glass to a depth in the glass that results in a depth of compression (DOC) of greater than or equal to 30 micrometers (μm);
after thermally treating the glass, introducing a compressive stress of greater than or equal to 400 megapascals (MPa) to the surface region of the glass by subjecting the glass to a second ion-exchange process under conditions sufficient to maintain a total central tension in the glass of less than 13 MPa, wherein after the second ion-exchange process, the glass article has a total central tension of less than 13 MPa;
optionally rinsing the glass after the initial ion exchange, after the thermal treatment, after the second ion exchange, or combinations thereof, wherein:
wherein the glass article is a container adapted to hold a pharmaceutical product, a vaccine, a biologic, a foodstuff, or a solution; and
wherein a total ion-exchange time for the glass article is about 2 hours or less.

* * * * *